US010303091B2

(12) United States Patent
Isomi et al.

(10) Patent No.: US 10,303,091 B2
(45) Date of Patent: May 28, 2019

(54) VOLTAGE DETECTION APPARATUS AND IMAGE FORMING APPARATUS

(71) Applicant: CANON KABUSHIKI KAISHA, Tokyo (JP)

(72) Inventors: Yusuke Isomi, Yokohama (JP); Masatoshi Itoh, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/815,152

(22) Filed: Nov. 16, 2017

(65) Prior Publication Data
US 2018/0149999 A1    May 31, 2018

(30) Foreign Application Priority Data

Nov. 28, 2016    (JP) .................................. 2016-230405

(51) Int. Cl.
| | | |
|---|---|---|
| G03G 15/00 | (2006.01) | |
| G03G 15/16 | (2006.01) | |
| H02H 11/00 | (2006.01) | |

(52) U.S. Cl.
CPC ..... G03G 15/1675 (2013.01); G03G 15/5004 (2013.01); G03G 15/80 (2013.01); H02H 11/007 (2013.01)

(58) Field of Classification Search
CPC ............... G03G 15/5004; G03G 15/80; G03G 15/1675; H02H 11/007
See application file for complete search history.

(56) References Cited

U.S. PATENT DOCUMENTS

| | | | |
|---|---|---|---|
| 9,823,617 B2 | 11/2017 | Shimura et al. | |
| 2009/0154942 A1* | 6/2009 | Hotogi | G03G 15/0851 399/27 |
| 2017/0003641 A1* | 1/2017 | Suzuki | G03G 15/80 |

FOREIGN PATENT DOCUMENTS

| | | |
|---|---|---|
| JP | 2001-309660 A | 11/2001 |
| JP | 5785126 B2 | 9/2015 |

OTHER PUBLICATIONS

U.S. Appl. No. 15/845,255, filed Dec. 18, 2017. Applicant: Masatoshi Itoh.

* cited by examiner

*Primary Examiner* — Sophia S Chen
(74) *Attorney, Agent, or Firm* — Venable LLP

(57) ABSTRACT

The voltage detection apparatus includes a transformer, in which a primary side and a secondary side are insulated from each other and the primary side connected in parallel with a first line and a second line, configured to output from the secondary side a voltage supplied to the primary side according to an alternating voltage; a detection circuit configured to detect a frequency of an alternating voltage; and a correction unit configured to acquire information corresponding to a voltage output from the transformer and information corresponding to a frequency detected by the detection circuit, and that corrects the information corresponding to the voltage according to the information corresponding to the frequency.

19 Claims, 14 Drawing Sheets

| CALCULATION TABLE ||
| --- | --- |
| DIGIT | CALCULATED VOLTAGE [V] |
| 242 | 100 |
| 247 | 101 |
| 252 | 102 |
| 257 | 103 |
| 262 | 104 |
| 267 | 105 |
| 272 | 106 |
| 277 | 107 |
| 282 | 108 |
| 288 | 109 |
| 293 | 110 |
| 298 | 111 |
| 304 | 112 |
| 309 | 113 |
| 315 | 114 |
| 320 | 115 |
| 326 | 116 |
| 332 | 117 |
| 337 | 118 |
| 343 | 119 |
| 349 | 120 |

(i) $-- V_1$ (50 Hz)
    $— V_2$ (50 Hz)

(ii) $-- V_1$ (50 Hz)
     $— V_2$ (55 Hz)

(iii) $-- V_1$ (50 Hz)
      $— V_2$ (60 Hz)

FIG. 4A

| AD VALUE (55Hz) | |
|---|---|
| ALTERNATING CURRENT POWER SUPPLY VOLTAGE $V_0$ [V] | DIGIT |
| 100 | 252 |
| 101 | 257 |
| 102 | 262 |
| 103 | 267 |
| 104 | 272 |
| 105 | 278 |
| 106 | 283 |
| 107 | 288 |
| 108 | 294 |
| 109 | 299 |
| 110 | 304 |
| 111 | 310 |
| 112 | 316 |
| 113 | 321 |
| 114 | 327 |
| 115 | 332 |
| 116 | 338 |
| 117 | 344 |
| 118 | 350 |
| 119 | 356 |
| 120 | 362 |

FIG. 4B

| REFERENCE CALCULATION TABLE (50Hz) | |
|---|---|
| DIGIT | CALCULATED VOLTAGE $V_4$ [V] |
| 242 | 100 |
| 247 | 101 |
| 252 | 102 |
| 257 | 103 |
| 262 | 104 |
| 267 | 105 |
| 272 | 106 |
| 277 | 107 |
| 282 | 108 |
| 288 | 109 |
| 293 | 110 |
| 298 | 111 |
| 304 | 112 |
| 309 | 113 |
| 315 | 114 |
| 320 | 115 |
| 326 | 116 |
| 332 | 117 |
| 337 | 118 |
| 343 | 119 |
| 349 | 120 |

FIG. 4C

| CORRECTION TABLE (55Hz) | |
|---|---|
| DIGIT | CORRECTION VOLTAGE $V_5$ [V] |
| 242 | 99 |
| 247 | 100 |
| 252 | 101 |
| 257 | 102 |
| 262 | 103 |
| 267 | 104 |
| 272 | 105 |
| 277 | 106 |
| 282 | 107 |
| 288 | 108 |
| 293 | 109 |
| 298 | 110 |
| 304 | 111 |
| 309 | 112 |
| 315 | 113 |
| 320 | 114 |
| 326 | 115 |
| 332 | 116 |
| 337 | 117 |
| 343 | 118 |
| 349 | 119 |

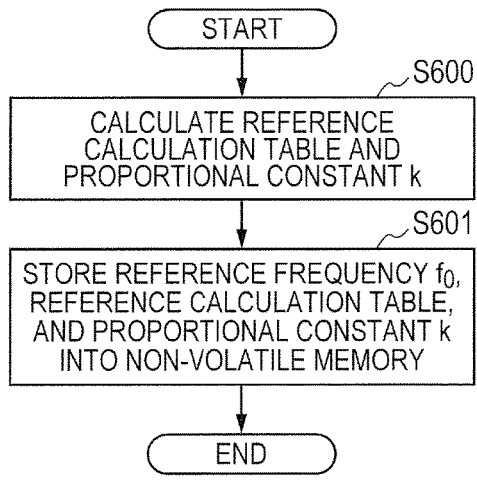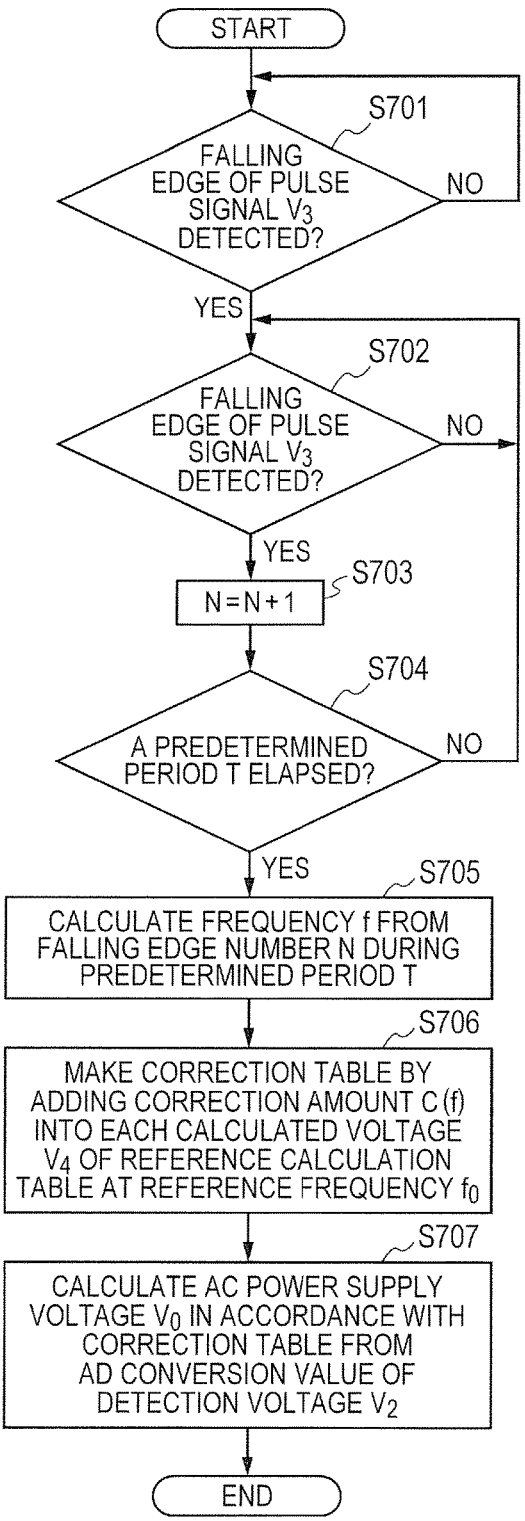

FIG. 7A

| AD VALUE (60 Hz) | |
|---|---|
| ALTERNATING CURRENT POWER SUPPLY VOLTAGE $V_0$ [V] | DIGIT |
| 100 | 255 |
| 101 | 260 |
| 102 | 265 |
| 103 | 270 |
| 104 | 275 |
| 105 | 281 |
| 106 | 286 |
| 107 | 292 |
| 108 | 297 |
| 109 | 303 |
| 110 | 308 |
| 130 | 430 |
| 131 | 437 |
| 132 | 444 |
| 133 | 451 |
| 134 | 457 |
| 135 | 464 |
| 136 | 471 |
| 137 | 478 |
| 138 | 485 |
| 139 | 492 |
| 140 | 499 |

FIG. 7B

| REFERENCE CALCULATION TABLE (50 Hz) | |
|---|---|
| DIGIT | CALCULATED VOLTAGE $V_4$ [V] |
| 245 | 101 |
| 250 | 102 |
| 255 | 103 |
| 260 | 104 |
| 265 | 105 |
| 270 | 106 |
| 275 | 107 |
| 281 | 108 |
| 286 | 109 |
| 292 | 110 |
| 411 | 130 |
| 417 | 131 |
| 424 | 132 |
| 430 | 133 |
| 437 | 134 |
| 444 | 135 |
| 451 | 136 |
| 457 | 137 |
| 464 | 138 |
| 471 | 139 |
| 478 | 140 |
| 485 | 142 |
| 492 | 143 |
| 499 | 144 |

FIG. 7C

| CORRECTION TABLE (60 Hz) | |
|---|---|
| DIGIT | CORRECTION VOLTAGE $V_5$ [V] |
| 255 | 100 |
| 260 | 101 |
| 265 | 102 |
| 270 | 103 |
| 275 | 104 |
| 281 | 105 |
| 286 | 106 |
| 292 | 107 |
| 297 | 108 |
| 303 | 109 |
| 308 | 110 |
| 430 | 130 |
| 437 | 131 |
| 444 | 132 |
| 451 | 133 |
| 457 | 134 |
| 464 | 135 |
| 471 | 136 |
| 478 | 137 |
| 485 | 138 |
| 492 | 139 |
| 499 | 140 |

FIG. 11A

| AD VALUE (60 Hz) | |
|---|---|
| ELECTRIC POWER $P_0$ [W] | DIGIT |
| 929 | 263 |
| 949 | 268 |
| 968 | 274 |
| 988 | 280 |
| 1008 | 285 |
| 1028 | 291 |
| 1049 | 297 |
| 1069 | 303 |
| 1090 | 308 |
| 1111 | 314 |
| 1131 | 320 |
| 1143 | 324 |
| 1165 | 330 |
| 1187 | 336 |
| 1199 | 339 |
| 1220 | 345 |
| 1242 | 351 |
| 1264 | 358 |
| 1287 | 364 |
| 1303 | 369 |
| 1322 | 374 |
| 1340 | 379 |
| 1357 | 384 |
| 1373 | 389 |
| 1392 | 394 |
| 1416 | 401 |
| 1420 | 402 |
| 1446 | 409 |
| 1464 | 414 |

FIG. 11B

| REFERENCE CALCULATION TABLE (50 Hz) | |
|---|---|
| DIGIT | CALCULATED ELECTRIC POWER $P_1$ [W] |
| 256 | 929 |
| 262 | 949 |
| 267 | 968 |
| 273 | 988 |
| 278 | 1008 |
| 284 | 1028 |
| 289 | 1049 |
| 295 | 1069 |
| 301 | 1090 |
| 307 | 1111 |
| 312 | 1131 |
| 315 | 1143 |
| 321 | 1165 |
| 327 | 1187 |
| 331 | 1199 |
| 337 | 1220 |
| 343 | 1242 |
| 349 | 1264 |
| 355 | 1287 |
| 360 | 1303 |
| 365 | 1322 |
| 370 | 1340 |
| 374 | 1357 |
| 379 | 1373 |
| 384 | 1392 |
| 391 | 1416 |
| 392 | 1420 |
| 399 | 1446 |
| 404 | 1464 |

FIG. 11C

| CORRECTION TABLE (60 Hz) | |
|---|---|
| DIGIT | CORRECTION ELECTRIC POWER $P_2$ [W] |
| 263 | 929 |
| 268 | 949 |
| 274 | 968 |
| 280 | 988 |
| 285 | 1008 |
| 291 | 1028 |
| 297 | 1049 |
| 303 | 1069 |
| 308 | 1090 |
| 314 | 1111 |
| 320 | 1131 |
| 324 | 1143 |
| 330 | 1165 |
| 336 | 1187 |
| 339 | 1199 |
| 345 | 1220 |
| 351 | 1242 |
| 358 | 1264 |
| 364 | 1287 |
| 369 | 1303 |
| 374 | 1322 |
| 379 | 1340 |
| 384 | 1357 |
| 389 | 1373 |
| 394 | 1392 |
| 401 | 1416 |
| 402 | 1420 |
| 409 | 1446 |
| 414 | 1464 |

VOLTAGE DETECTION APPARATUS AND IMAGE FORMING APPARATUS

BACKGROUND OF THE INVENTION

Field of the Invention

The present invention relates to a voltage detection apparatus that implements a method for detecting a voltage of an alternating-current power supply that uses a power transformer, a power detection apparatus, and an image forming apparatus that includes the voltage detection apparatus or power detection apparatus.

Description of the Related Art

In a method for detecting a voltage in a voltage detection circuit, a voltage of an alternating-current power supply is calculated by detecting a voltage across both ends (hereunder, referred to as "end-to-end voltage") of a resistor for voltage detection that is connected to an output terminal of a power transformer which is connected between transmission lines of the alternating-current power supply. The end-to-end voltage of the resistance is determined according to the voltage of the alternating-current power supply, constants of the resistance for voltage detection, and a winding number ratio of the power transformer. Methods for detecting a voltage in a voltage detection circuit have been proposed in Japanese Patent Application Laid-Open No. 2001-309660 and Japanese Patent No. 5785126.

A silicon steel plate is generally used as a core material of a transformer that is operated within the frequency region of an alternating voltage of a commercial power supply. However, although depending on the intended use and specifications of the particular transformer, a transformer that uses ferrite as the core material thereof is sometimes lighter in weight and less expensive than other types of transformers. In the case of using a transformer that uses ferrite within a frequency range of a commercial power supply, the calculated value of the voltage of the alternating-current power supply is determined in accordance with the end-to-end voltage of the resistance for voltage detection. However, in the case of a transformer that uses ferrite, the output impedance of the transformer that depends on the frequency of the alternating-current power supply fluctuates significantly in comparison to when using a silicon steel plate. If the frequency of the alternating-current power supply is different, even if the voltage of the alternating-current power supply is the same, the end-to-end voltage of the resistance for voltage detection may sometimes change due to fluctuations in the output impedance, and an error will arise in the calculated voltage of the alternating-current power supply.

SUMMARY OF THE INVENTION

According to one aspect of the present invention, there is provided a voltage detection apparatus that, when detecting the voltage of an alternating-current power supply using a power transformer, enables the reduction of an error in a detection result that depends on the frequency of the alternating-current power supply.

Another aspect of the present invention is 1. A voltage detection apparatus including a first line and a second line configured to supply an alternating voltage that is input from an alternating current power supply to a load, a transformer, in which a primary side and a secondary side are insulated from each other, the primary side connected in parallel with the first line and the second line, configured to output a voltage from the secondary side according to the alternating voltage supplied to the primary side, a detection circuit configured to detect a frequency of the alternating voltage, and a correction unit configured to acquire information corresponding to a voltage that is output from the transformer and information corresponding to the frequency that is detected by the detection circuit, and that corrects the information corresponding to the voltage according to the information corresponding to the frequency.

A further aspect of the present invention is An image forming apparatus including an image forming unit connected to a first signal wire and a second signal wire to which an alternating voltage from a commercial alternating current power supply is supplied, and to which an electric power is supplied, a transformer in which a primary side and a secondary side are insulated from each other, and the primary side is connected in parallel with the first signal wire and the second signal wire, a detection circuit configured to detect a frequency of the alternating voltage, a correction unit configured to acquire information corresponding to a voltage that is output from the transformer and information corresponding to the frequency that is detected by the detection circuit, and that corrects the information corresponding to the voltage according to the information corresponding to the frequency, and a control unit configured to control an electric power that is supplied to the image forming unit based on the information corresponding to the voltage that is corrected.

Further features of the present invention will become apparent from the following description of exemplary embodiments with reference to the attached drawings.

BRIEF DESCRIPTION OF THE DRAWINGS

FIG. 4A, FIG. 4B and FIG. 4C are views illustrating correction tables corresponding to frequencies of an alternating-current power supply according to Embodiment 1.

FIG. 5A and FIG. 5B are flowcharts illustrating voltage detection processing according to Embodiment 1.

FIG. 7A, FIG. 7B and FIG. 7C are views illustrating correction tables corresponding to frequencies of an alternating-current power supply according to Embodiment 2.

FIG. 11A, FIG. 11B and FIG. 11C are views illustrating correction tables corresponding to frequencies of an alternating-current power supply according to Embodiment 3.

DESCRIPTION OF THE EMBODIMENTS

Preferred embodiments of the present invention will now be described in detail in accordance with the accompanying drawings.

According to Embodiment 1, in a voltage detection circuit that uses a transformer, a voltage of an alternating-current power supply that is calculated based on an end-to-end voltage of a resistance for voltage detection that is connected to both ends of the transformer is corrected according to the frequency of the alternating-current power supply. Thereby, it is possible to reduce an error at the time of voltage detection that arises due to frequency fluctuations in the alternating-current power supply.

[Configuration of Voltage Detection Circuit]

Figure 1A:
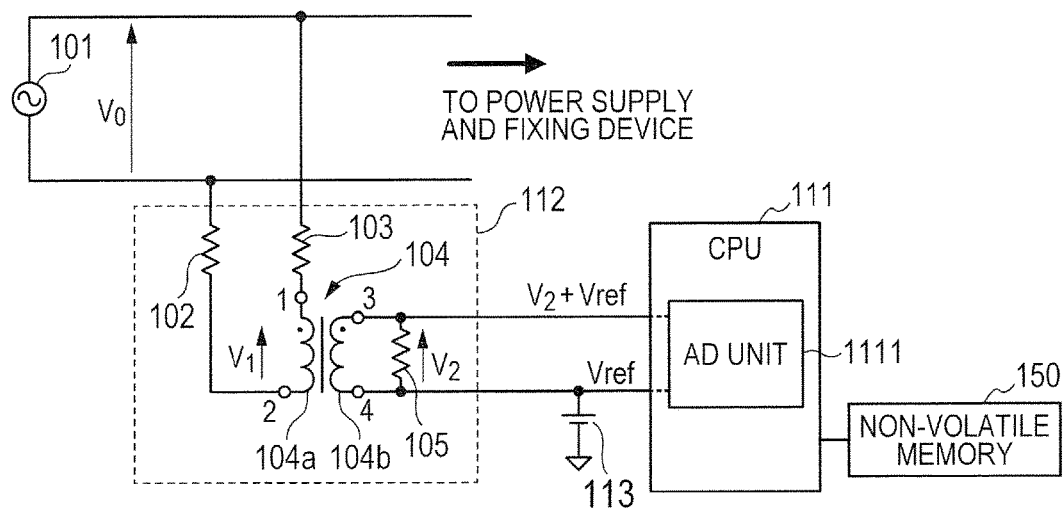
FIG. 1A and FIG. 1B are a view that illustrates the circuitry of a voltage detection circuit and a view that illustrates various waveforms according to Embodiment 1.

FIG. 1A is a circuit configuration diagram of a voltage detection apparatus including a voltage detection circuit 112 according to Embodiment 1. The voltage detection circuit 112 has a transformer 104 that is a power transformer which is connected in parallel through current decreasing resistances 102 and 103 to an alternating-current power supply 101. The transformer 104 is a transformer for detecting the voltage of the alternating-current power supply 101, and, for example, ferrite is used for the core thereof. Note that the core material of the transformer 104 may be a different core material to ferrite. The transformer 104 has a primary winding 104a and a secondary winding 104b, and the primary winding 104a and the secondary winding 104b have the same polarity. One end (the side connected to the current decreasing resistance 103) of the primary winding 104a is referred to as "terminal 1", and the other end of the primary winding 104a (the side connected to the current decreasing resistance 102) is referred to as "terminal 2". One end (the side connected to a direct-current power supply 113) of the secondary winding 104b is referred to as "terminal 4", and the other end of the secondary winding 104b is referred to as "terminal 3".

The voltage detection circuit 112 has a resistance 105 for voltage detection (hereunder, referred to as "voltage detection resistance 105") that is connected between terminal 3 and terminal 4 of the transformer 104. An end-to-end voltage $V_2$ (hereunder, referred to as "detection voltage $V_2$") of the voltage detection resistance 105 becomes, in a state in which the voltage has been offset by an offset voltage $V_{ref}$ of the direct-current power supply 113, a waveform that resembles a waveform of a voltage $V_0$ of the alternating-current power supply 101 (hereunder, referred to as "alternating-current power supply voltage $V_0$"). The secondary winding 104b of the transformer 104 is connected to a CPU 111 that is a calculation unit. A voltage $(V_2+V_{ref})$ obtained by adding the offset voltage $V_{ref}$ to the detection voltage $V_2$ is input to the CPU 111 from the terminal 3 of the transformer 104, and the offset voltage $V_{ref}$ is input to the CPU 111 from the terminal 4 of the transformer 104. The CPU 111 calculates the alternating-current power supply voltage $V_0$ using the offset voltage $V_{ref}$ and the detection voltage $V_2$. Hereafter, the alternating-current power supply voltage $V_0$ that the CPU 111 calculated is referred to as "calculated voltage $V_4$". The CPU 111 reads information that is stored in a non-volatile memory 150, and writes information to the non-volatile memory 150. Note that the alternating-current power supply 101, for example, supplies an alternating voltage to a power supply apparatus of an image forming apparatus, and supplies an alternating voltage to a fixing apparatus of the image forming apparatus. A voltage $V_1$ is a voltage between the terminal 1 and terminal 2 of the primary winding 104a of the transformer 104.

[Operations of Voltage Detection Circuit]

Figure 1B:
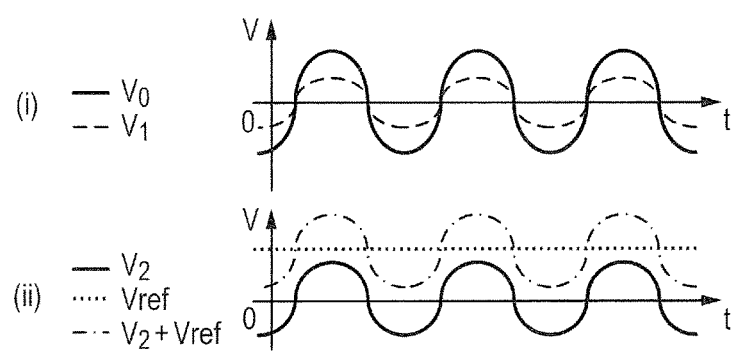

The operations of the voltage detection circuit 112 according to Embodiment 1 will now be described using FIG. 1B. In FIG. 1B, (i) is a graph in which time (t) is represented on the axis of abscissa, voltage (V) is represented on the axis of ordinates, the alternating-current power supply voltage $V_0$ is represented with a solid line, and the voltage $V_1$ between terminal 1 and terminal 2 of the primary winding 104a of the transformer 104 is represented with a dashed line. In (ii) in FIG. 1B, the detection voltage $V_2$ that is a voltage between terminal 3 and terminal 4 of the secondary winding 104b of the transformer 104 is represented with a solid line. In (ii) in FIG. 1B, a voltage $(V_2+V_{ref})$ which is input to the CPU 111 and which is obtained by offsetting the detection voltage $V_2$ that is the end-to-end voltage of the voltage detection resistance 105 by an amount corresponding to the offset voltage $V_{ref}$ is represented with an alternate long and short dashed line. In (ii) in FIG. 1B, the offset voltage $V_{ref}$ of the direct-current power supply 113 is represented with a dotted line.

When the alternating-current power supply voltage $V_0$ is applied, the voltage $V_1$ is applied between terminal 1 and terminal 2 of the transformer 104 through the current decreasing resistances 102 and 103. At such time, a detection voltage $V_2$ that is in accordance with the winding number ratio between the primary winding 104a and the secondary winding 104b of the transformer 104 is output at both ends of the voltage detection resistance 105. The detection voltage $V_2$ is offset by the amount of the offset voltage $V_{ref}$, is input to an analog-digital (hereunder, referred to as "AD") port of the CPU 111, and is converted from an analog value to a digital value by the CPU 111 and an AD unit 1111.

[Calculation of Calculated Voltage $V_4$]

Figures 2A, 2B:
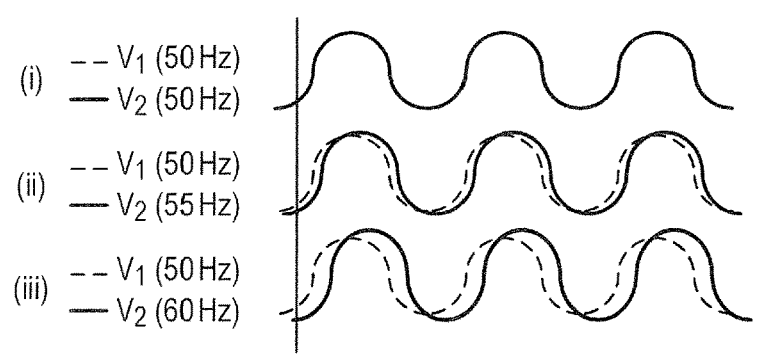
FIG. 2A and FIG. 2B are a view that illustrates a reference calculation table and a view that illustrates various waveforms for respective frequencies according to Embodiment 1.

Next, the method used for calculating the calculated voltage $V_4$ by the CPU 111 is described. FIG. 2A is a calculation table for determining the calculated voltage $V_4$ based on a digital value obtained after the detection voltage $V_2$ is subjected to AD conversion by the AD unit 1111 that is a conversion unit which the CPU 111 includes. The calculation table in FIG. 2A is stored in advance in the non-volatile memory 150 as a storage unit. In the calculation table in FIG. 2A, digits in the column on the left side show digital values after the detection voltage $V_2$ is subjected to AD conversion, and calculated voltages [V] in the column on the right side show the calculated voltages $V_4$ corresponding to the digital values after AD conversion. For example, in a case where the digital value after the detection voltage $V_2$ is subjected to AD conversion is 242, the CPU 111 refers to the digital value 242 in the calculation table and determines that the calculated voltage $V_4$ is 100 V ($V_4$=100 V). The CPU 111, for example, calculates the calculated voltage $V_4$ by comparing the AD value of the detection voltage $V_2$ with the calculation table shown in FIG. 2A that is stored in the non-volatile memory 150, and detects the alternating-current power supply voltage $V_0$ based on the calculated voltage $V_4$ that is calculated. Although in Embodiment 1 the calculated voltage $V_4$ is determined using the calculation table in FIG. 2A, the present invention is not limited to the present configuration, and can also be realized by using a function that derives the calculated voltage $V_4$.

[Detection Voltage $V_2$ and Detection Error Dependent on Frequency of Alternating-Current Power Supply]

Next, operations in a case where an error arises in the calculated voltage $V_4$ due to the detection voltage $V_2$ changing in a manner that depends on a frequency f of the alternating-current power supply are described using FIG. 2B. In FIG. 2B, a waveform of the voltage $V_1$ between terminal 1 and terminal 2 of the transformer 104 is represented with a dashed line, and a waveform of the detection voltage $V_2$ (voltage between terminal 3 and terminal 4) is represented with a solid line. In FIG. 2B, (i) illustrates a case where the frequency f of the alternating-current power supply 101 is 50 Hz, (ii) illustrates a case where the frequency f of the alternating-current power supply 101 is 55 Hz, and (iii) illustrates a case where the frequency f of the alternating-current power supply 101 is 60 Hz. To simplify the description, it is assumed that the winding number ratio between the primary winding 104a and the secondary winding 104b of the transformer 104 is 1:1.

As illustrated in (i) in FIG. 2B, when the frequency f is 50 Hz, the voltage $V_1$ and the detection voltage $V_2$ show the same value in accordance with the winding number ratio. In contrast, in a case where the frequency f is 55 Hz as shown in (ii) in FIG. 2B, and in a case where the frequency f is 60 Hz as shown in (iii) in FIG. 2B, as the frequency f increases, the amplitude of the detection voltage $V_2$ increases relative to the amplitude of the voltage $V_1$ for the case where the frequency f is 50 Hz. This is because a combined impedance $Z_2$ of an excitation inductance $L_{P2}$ (not shown in the drawings) between terminal 3 and terminal 4 of the transformer 104 and the voltage detection resistance 105 changes depending on the frequency f. When the combined impedance $Z_2$ changes depending on the frequency f, the detection voltage $V_2$ also changes depending on the frequency f. The relational expression between the voltage $V_1$ and the detection voltage $V_2$, and the relational expressions between the alternating-current power supply voltage $V_0$ and the voltage $V_1$ are represented hereunder.

<Relational Expression Between Voltage $V_1$ and Detection Voltage $V_2$>

$$V_2 = (N_2/N_1) \cdot V_1 \quad (1),$$

where $N_1$ represents the number of turns of the primary winding 104a of the transformer 104, and $N_2$ represents the number of turns of the secondary winding 104b of the transformer 104.

<Relational Expressions Between Alternating-Current Power Supply Voltage $V_0$ and Voltage $V_1$>

$$V_1 = |Z_1|/(R102+R103+|Z_1|) \cdot V_0 \quad (2)$$

$$|Z_1| = (N_1/N_2)^2 \cdot |Z_2| \quad (3)$$

$$|Z_2| = (2\pi f L_{p2} \cdot R105)/\sqrt{(R105^2+(2\pi f)L_{p2})^2)} \quad (4),$$

where $Z_1$ represents a value obtained when the combined impedance $Z_2$ is converted to an impedance between terminal 1 and terminal 2 of the transformer 104, $L_{P2}$ represents the excitation inductance as seen from the terminal 3 and terminal 4 side of the transformer 104, f represents the frequency of the alternating-current power supply 101, R102 and R103 represent the resistance values of the current decreasing resistances 102 and 103, R105 represents the resistance value of the voltage detection resistance 105.

Expression (1) shows that the relation between the detection voltage $V_2$ and the voltage $V_1$ is determined by the winding number ratio between the primary winding 104a and the secondary winding 104b of the transformer 104. It is found based on Expression (2) that the voltage $V_1$ is determined by the ratio between the combined impedance $Z_1$ and the resistance values of the current decreasing resistances 102 and 103. Expression (3) shows that the combined impedance $Z_1$ and the combined impedance $Z_2$ are determined by the winding number ratio between the primary winding 104a and the secondary winding 104b of the transformer 104. Further, it is found based on Expression (4) that the combined impedance $Z_2$ becomes a larger value as the frequency f increases.

Based on the foregoing, it is found that the detection voltage $V_2$ changes as a result of the combined impedance $Z_2$ changing depending on the frequency f of the alternating-current power supply 101. On the other hand, with respect to the calculation table which the CPU 111 uses, only one kind of calculation table which is illustrated in FIG. 2A and which does not change depending on the frequency f is prepared. Even in a case where the alternating-current power supply voltage $V_0$ is the same, the digital value of the detection voltage $V_2$ increases as the frequency f of the alternating-current power supply 101 rises. Because the CPU 111 determines the calculated voltage $V_4$ based on the digital value of the detection voltage $V_2$ and the single calculation table (FIG. 2A), the CPU 111 estimates the calculated voltage $V_4$ as being a value that is higher than the actual alternating-current power supply voltage $V_0$, and thus an error occurs.

[Correction of Calculated Voltage $V_4$]

Figure 3:
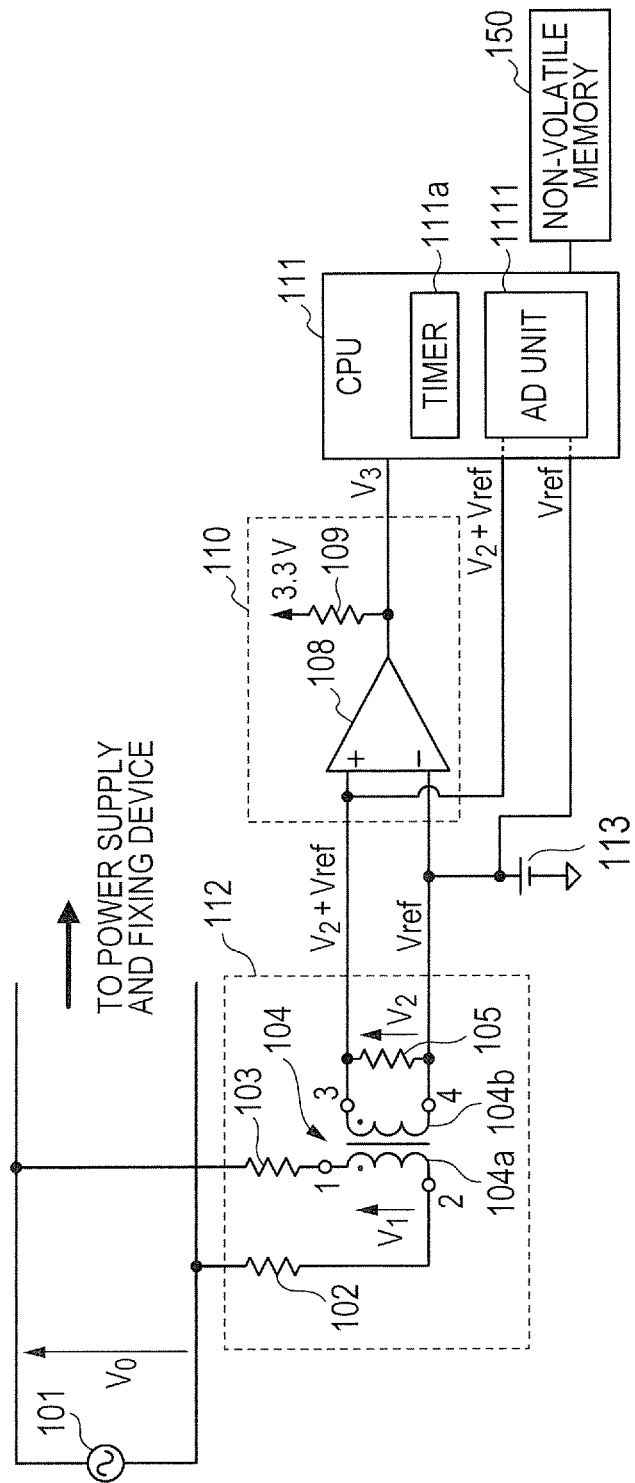
FIG. 3 is a circuit diagram of a voltage detection circuit including a frequency detection circuit according to Embodiment 1.

Next, the circuit configuration and operations in a case of reducing an error at a time of voltage detection by correcting the calculation table in accordance with the frequency f of the alternating-current power supply 101 will be described. FIG. 3 is a view illustrating a circuit configuration in which a frequency detection circuit 110 that is a detection unit for detecting the frequency f of the alternating-current power supply 101 is added to the basic circuit configuration shown in FIG. 1A. The frequency detection circuit 110 of Embodiment 1 is connected to the secondary side of the transformer 104. Components that are the same as components described above in relation to FIG. 1A are denoted by the same reference numerals and a description of such components is omitted here.

The frequency detection circuit 110 as a detection unit has a comparator 108 and a resistance 109. A voltage obtained by adding the offset voltage $V_{ref}$ to the detection voltage $V_2$ is input to a noninverting input terminal of the comparator 108, and the offset voltage $V_{ref}$ of the direct-current power supply 113 is input to an inverting input terminal of the comparator 108. The resistance 109 that is pulled-up to a direct-current voltage of 3.3 V is connected to an output terminal of the comparator 108. The comparator 108 compares the voltage $V_2 + V_{ref}$ and the offset voltage $V_{ref}$, generates a pulse signal $V_3$ having a frequency equal to the frequency f of the alternating-current power supply 101, and outputs the pulse signal $V_3$ to the CPU 111. The CPU 111 detects the frequency f of the alternating-current power supply 101 by counting falling edges of the pulse signals $V_3$ detected within a predetermined period. Although in Embodiment 1 the frequency detection circuit 110 is configured using the comparator 108, for example, it is also possible to realize the configuration of the present invention with a circuit that uses a transistor, and the present invention is not limited to the present configuration.

The CPU 111 adds a correction value C that changes in proportion to the frequency f to a calculated voltage $V_4$ of a calculation table (hereunder, referred to as "reference calculation table) with respect to a reference frequency $f_0$ that is a predetermined frequency, that is stored in advance in the non-volatile memory 150. Thereby, the CPU 111 corrects the voltage in accordance with the frequency f. The correction value C can be described as a function of the frequency f, and is written as C(f). The CPU 111 functions as a correction unit that corrects the calculated voltage $V_4$ in accordance with the frequency f of the alternating-current power supply 101. Hereinafter, the calculated voltage $V_4$ after correction is referred to as "correction voltage $V_5$". The relation between the frequency f of the alternating-current power supply 101 and the correction voltage $V_5$ is determined by the following Expressions (5) and (6) using the reference frequency $f_0$ in the reference calculation table, the frequency f and the correction value C. A proportional constant k is determined in accordance with the amount of variation in the voltage that depends on the frequency f when the alternating-current power supply voltage $V_0$ is made constant.

$$V_5 = V_4 + C(f) \quad (5)$$

$$C(f) = k \cdot (f_0 - f) \quad (6)$$

Next, the present embodiment will be described using specific numerical values. In Embodiment 1, it is assumed that the current decreasing resistances 102 and 103 are 43 kΩ, the voltage detection resistance 105 is 620Ω, the winding number ratio of the transformer 104 is $N_{1\text{-}2}$:$N_{3\text{-}4}$=1200:1800, the offset voltage $V_{ref}$=1.4 V, and the alternating-current power supply frequency f=55 Hz. Further, it is assumed that the AD port of the CPU 111 has 10-bit resolution, and the relation between the AD convertible voltage range and the AD value is 0 to 1023 with respect to a voltage range of 0 V to 2.8 V.

FIG. 4A illustrates a table in a case where the frequency f of the alternating-current power supply 101 is 55 Hz, in which the column on the left side shows the alternating-current power supply voltage $V_0$[V], and the column on the right side shows a digital value (digit) after AD conversion. FIG. 4B illustrates a reference calculation table as a first table in a case where the reference frequency $f_0$ is set as $f_0$=50 Hz, in which the column on the left side shows a digital value (digit) after AD conversion of the detection voltage $V_2$, and the column on the right side shows the calculated voltage $V_4$[V]. FIG. 4C illustrates a calculation table (hereunder, referred to as "correction table") as a second table that is obtained after the correction value C is added to the reference calculation table in a case where the frequency of the alternating-current power supply 101 is 55 Hz. In FIG. 4C, the column on the left side shows a digital value (digit) after AD conversion of the detection voltage $V_2$, and the column on the right side shows the correction voltage $V_5$[V].

The digital value after AD conversion is uniquely determined based on the resolution of the AD port of the CPU 111 and the detection voltage $V_2$. The reference frequency $f_0$, the reference calculation table, and the proportional constant k are stored in advance in the non-volatile memory 150 of the CPU 111. The proportional constant k is set as k=⅕ based on the amount of displacement of a detection error for the calculated voltage $V_4$ for each of three points that are points for which the frequency f was changed to 50 Hz, 55 Hz and 60 Hz when the alternating-current power supply voltage $V_0$ of the alternating-current power supply 101 is 100 V. At this time, the correction value C and the correction voltage $V_5$ when the frequency f of the alternating-current power supply 101 is 55 Hz are obtained as described hereunder based on Expressions (7) and (8).

$$V_5 = V_4 + C(55) \quad (7)$$

$$C(55) = \tfrac{1}{5} \times (50 - 55) = -1 \quad (8)$$

The correction table for frequency f=55 Hz shown in FIG. 4C is obtained as a result ($V_5 = V_4 - 1$) that was calculated based on the reference calculation table shown in FIG. 4B and Expressions (7) and (8).

FIG. 4A shows respective digital values (digits) after AD conversion of detection voltages $V_2$ that are obtained with respect to respective alternating-current power supply voltages $V_0$ when the frequency f is 55 Hz. As illustrated in FIG. 4A, taking the alternating-current power supply voltage $V_0$=100 V of the AD conversion table as an example, the digital value after AD conversion of the detection voltage $V_2$ when the alternating-current power supply voltage $V_0$=100 V is 252. In a case where the digital value is 252, if the calculated voltage $V_4$ is determined based on the reference calculation table for reference frequency $f_0$=50 Hz, the determined value will be 102 V, which means the determined value is detected as being 2 V higher than 100 V which is the actual alternating-current power supply voltage $V_0$. On the other hand, if the correction voltage $V_5$ is determined based on the correction table shown in FIG. 4C in which the correction value C(f) shown in Expression (7) is factored in, it is determined that $V_5$=102−1=101 V. Thus, when determining the alternating-current power supply voltage $V_0$ using the correction table, an error at the time of voltage detection can be reduced to 1 V.

[Voltage Detection Processing]
(Advance Processing)

Next, correction control at the time of voltage detection by the CPU 111 of Embodiment 1 is described using the flowcharts in FIG. 5A and FIG. 5B. A voltage detection operation is divided into advance processing illustrated in FIG. 5A and voltage detection processing illustrated in FIG. 5B. The advance processing is executed by the CPU 111, for example, at the time of factory shipment, or is executed by a control unit of an image forming apparatus after installation of the image forming apparatus or the like. In the following description, the advance processing is described as being executed by the CPU 111. In step (hereunder, abbreviated to "S") 600, the CPU 111 determines the relation between digital values (digits) after AD conversion of the detection voltage $V_2$ and the calculated voltage $V_4$ at the reference frequency $f_0$ by experimentation or the like in advance, and creates the reference calculation table. The CPU 111 also determines the proportional constant k that is determined in accordance with the frequency $f_0$ by experimentation or the like in advance. In S601, the CPU 111 stores the reference frequency $f_0$, and the created reference calculation table and proportional constant k obtained in S600 in the non-volatile memory 150, and ends the advance processing.

(Voltage Detection Processing)

At the time of voltage detection processing, the CPU 111 performs the processing from S701 onward. In S701, the CPU 111 monitors an input port to which a pulse signal $V_3$ is input from the frequency detection circuit 110, and determines whether or not the falling edge of the pulse signal $V_3$ that is generated by the frequency detection circuit 110 is detected. If the CPU 111 determines in S701 that the falling edge of the pulse signal $V_3$ is not detected, the CPU 111 returns the processing to S701, while if the CPU 111 determines in S701 that the falling edge of the pulse signal $V_3$ is detected, the CPU 111 advances the processing to S702. In order to count a number N of falling edges of the pulse signal $V_3$ that are detected (hereunder, referred to as "falling edge number N"), the CPU 111 initializes the falling edge number N. Further, the CPU 111 resets and starts a timer 111a that the CPU 111 has. From that time onward, the CPU 111 counts the falling edge number N of the pulse signal $V_3$ during a predetermined period T.

In S702, the CPU 111 determines whether or not a falling edge of the pulse signal $V_3$ is detected. If the CPU 111 determines in S702 that the falling edge is not detected, the CPU 111 returns the processing to S702, while if the CPU 111 determines in S702 that the falling edge is detected, the CPU 111 advances the processing to S703. In S703, the CPU 111 adds 1 to the falling edge number N (N=N+1). In S704, the CPU 111 refers to the timer 111a to determine whether or not the predetermined period T has elapsed. The predetermined period T is set so as to be a multiple of the frequency of the alternating-current power supply 101, and for example is set as several milliseconds. In S704, if the CPU 111 determines that the predetermined period T has not elapsed, the CPU 111 returns the processing to S702, while if the CPU 111 determines that the predetermined period T has elapsed, the CPU 111 advances the processing to S705.

In S705, the CPU 111 calculates the frequency f of the alternating-current power supply 101 based on the predetermined period T and the falling edge number N. In S706, the CPU 111 reads, from the non-volatile memory 150, the reference frequency $f_0$, the reference calculation table and the proportional constant k that were stored in advance in the non-volatile memory 150 in S601. The CPU 111 determines a correction amount $C(f)$ $(=k \times (f-f_0))$ based on Expression (6) using the frequency f calculated in S705 and the reference frequency $f_0$ and proportional constant k. The CPU 111 determines respective correction voltages $V_5$ based on Expression (5) using the respective calculated voltages $V_4$ in the reference calculation table and the determined correction amount $C(f)$, and creates a correction table in accordance with the frequency f calculated in S705. In S707, the CPU 111 calculates the correction voltage $V_5$ corresponding to the detection voltage $V_2$ in accordance with the digital value obtained after the detection voltage $V_2$ is subjected to AD conversion and the correction table created in S706, and then ends the processing. Thereby the CPU 111 obtains the alternating-current power supply voltage $V_0$ (correction voltage $V_5$) of the alternating-current power supply 101.

As described above, in Embodiment 1, with respect to a voltage detection apparatus that uses a transformer, an alternating-current power supply voltage that is calculated based on a voltage result of a voltage detection resistance that is connected to both ends of the transformer is subjected to a correction that is in accordance with the frequency of the alternating-current power supply. Thereby it is possible to reduce a voltage detection error that arises due to the output terminal impedance of the transformer changing depending on the frequency of the alternating-current power supply. Thus, according to Embodiment 1, when detecting the voltage of an alternating-current power supply using a power transformer, an error in a detection result that depends on the frequency of the alternating-current power supply can be reduced.

[Frequency Detection Circuit]

Figure 6A:
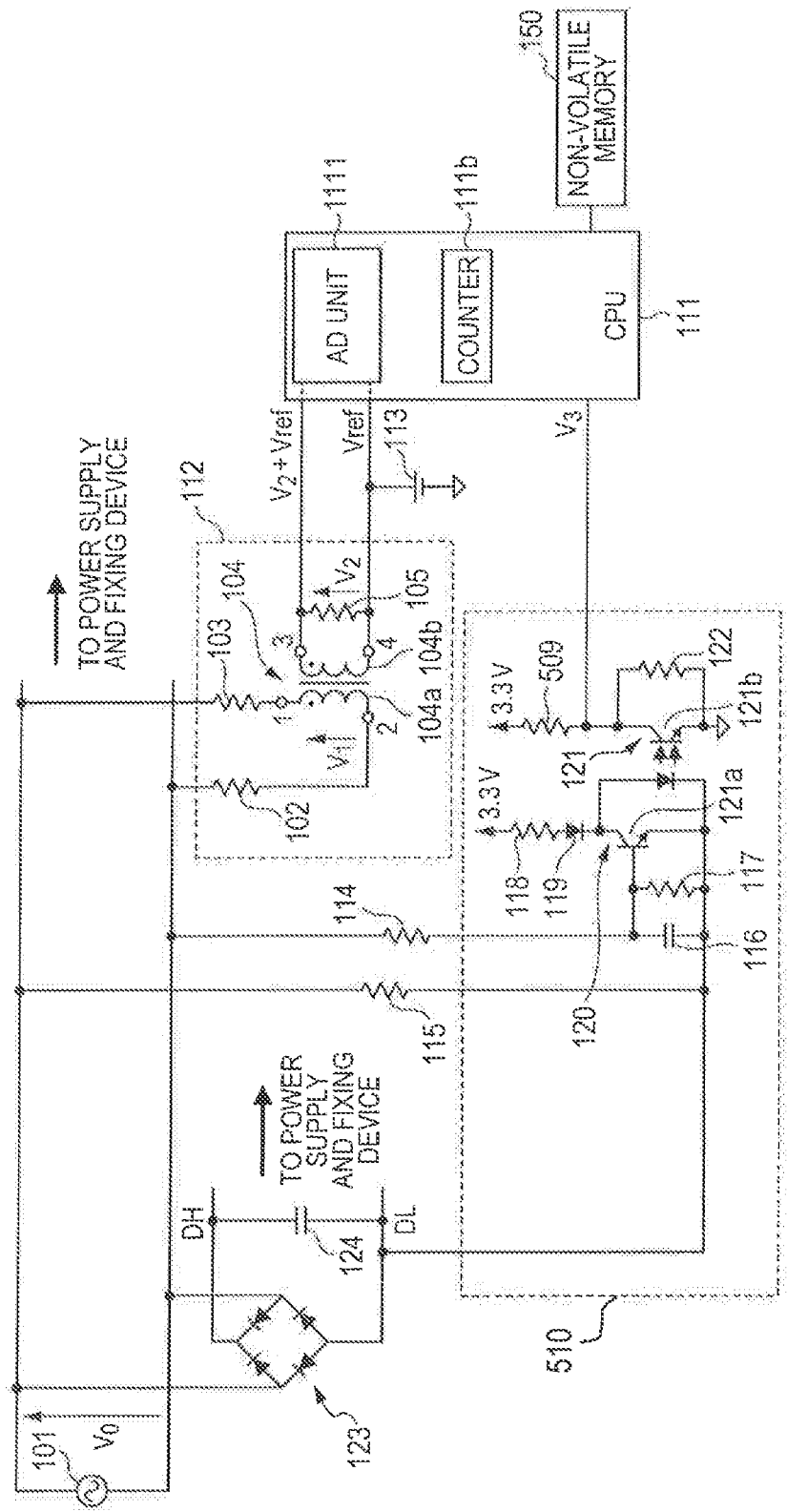
FIG. 6A is a circuit diagram of a voltage detection circuit including a frequency detection circuit according to Embodiment 2.

In Embodiment 2, the frequency detection method and voltage correction method are different from Embodiment 1. In the circuit configuration of Embodiment 2, only a frequency detection circuit 510 as a detection unit differs from the circuit configuration of Embodiment 1, and this difference will now be described using FIG. 6A. The frequency detection circuit 510 of Embodiment 2 is connected to the primary side of the transformer 104.

The alternating voltage of the alternating-current power supply 101 is rectified by a rectifying circuit 123, and smoothed by a smoothing capacitor (having a high potential side DH and a low potential side DL). The direct-current voltage that was smoothed by the smoothing capacitor 124 is supplied, for example, to a power supply circuit or fixing device of an image forming apparatus that is connected at a stage after the smoothing capacitor 124. One end of a resistance 114 is connected to one of the lines of the alternating-current power supply 101. The base terminal of a transistor 120 is connected to the other end of the resistance 114. In the transistor 120, a cathode terminal of a diode 119 is connected to the collector terminal, and the emitter terminal is connected to a low-potential side DL of the smoothing capacitor 124. A resistance 117 is connected between the base and emitter of the transistor 120, and a capacitor 116 is also connected between the base and the emitter. The anode terminal of the diode 119 is connected through a resistance 118 to a power supply voltage (for example, 3.3 V). A photodiode 121a of a photocoupler 121 is connected between the collector and emitter of the transistor 120. A collector terminal of a phototransistor 121b of the photocoupler 121 is connected to a power supply voltage (for example, 3.3 V) through a resistance 509, and the emitter terminal is grounded. A resistance 122 is connected between a collector and emitter of the phototransistor 121b of the photocoupler 121. A connecting point between the resistance 509 and the collector terminal of the phototransistor 121b of the photocoupler 121 is connected to an input port of the CPU 111, and the pulse signal V3 is input to the input port of the CPU 111. One end of the resistance 115 is connected to the other line of the alternating-current power supply 101, and the other end of the resistance 115 is connected to the low-potential side DL of the smoothing capacitor 124.

At a timing at which a current flows in the direction from the resistance 115 to the resistance 114, a current does not flow between the base and emitter of the transistor 120, and the transistor 120 enters a non-conducting state. When the transistor 120 is in a non-conducting state, a current flows from the direct-current power supply (3.3 V) along a route including the resistance 118, the diode 119, and the photodiode 121a of the photocoupler 121. When the current flows to the photodiode 121a of the photocoupler 121, the phototransistor 121b of the photocoupler 121 enters a conducting state, and the pulse signal $V_3$ that is output to the CPU 111 becomes low level (vicinity of 0 V).

Next, at a timing at which a current flows in the direction from the resistance 114 to the resistance 115, the current flows between the base and emitter of the transistor 120, and the transistor 120 enters a conducting state. When the transistor 120 is in a conducting state, a sufficient voltage is not applied to both ends of the photodiode 121a of the photocoupler 121, and the phototransistor 121b enters a non-conducting state. When the photodiode 121b of the photocoupler 121 enters a non-conducting state, the pulse signal $V_3$ that is output to the CPU 111 becomes high level (vicinity of power supply voltage (3.3 V)). By repeating such operations, the frequency detection circuit 510 generates the pulse signal $V_3$ that changes depending on the current direction of the alternating-current power supply voltage $V_0$.

During a period from the falling edge of the pulse signal $V_3$ that is input from the frequency detection circuit 510 to the next falling edge of the pulse signal $V_3$, the CPU 111 counts by means of a counter 111b that operates in accordance with an internal clock of the CPU 111, and calculates the frequency f of the alternating-current power supply 101. The CPU 111 multiplies the calculated voltage $V_4$ of the reference calculation table by the correction coefficient k that is expressed as a function of the calculated frequency f of the alternating-current power supply 101, to thereby calculate the correction voltage $V_5$. Thereby, in Embodiment 2 also, it is possible to accurately correct a voltage detection error.

When performing correction of the calculated voltage $V_4$ in accordance with the frequency f of the alternating-current power supply 101, the reference frequency $f_0$ is determined in advance, and a reference calculation table at the reference frequency $f_0$ is created. Specifically, taking the reference frequency $f_0$ as constant, digital values of the detection voltage $V_2$ when the alternating-current power supply voltage $V_0$ is caused to vary are determined, the correlation between the digital values of the detection voltage $V_2$ and the calculated voltage $V_4$ are determined, and a reference calculation table is created. Next, in order to determine the correction coefficient k, the calculated voltages $V_4$ for the reference calculation table in a case where the alternating-current power supply voltage $V_0$ is fixed and the frequency f is caused to vary are determined. In this case, a calculation result at the reference frequency $f_0$ for a certain alternating-current power supply voltage $V_0$ is taken as a reference calculated voltage $V_{4\_f_0}$. In a state in which the alternating-current power supply voltage $V_0$ is fixed, the frequency f is changed to $f_0$, $f_1$, and $f_2$. In this case, the relation between the frequencies $f_0$, $f_1$ and $f_2$ is $f_0 < f_1 < f_2$. Next, in accordance with the reference calculation table, calculated voltages $V_4$ corresponding to digital values of the detection voltage $V_2$ obtained at the time of the frequencies $f_1$ and $f_2$, respectively, are calculated as $V_{4\_f_1}$ and $V_{4\_f_2}$, respectively. Thereafter, based on the amount of variation between the calculated voltages $V_{4\_f_1}$ and $V_{4\_f_2}$ at the respective frequencies and the reference calculated voltage $V_{4\_f_0}$, a correction coefficient k(f) represented by Expression (9) is derived by the least-squares method. The correction coefficient k(f) is expressed as a primary function of a gradient a, an inception b and the frequency f.

$$k(f) = a \cdot f + b \quad (9)$$

The gradient a and the inception b of the correction coefficient k(f), and the reference calculation table are stored in advance in the non-volatile memory 150. At the time of voltage detection, the correction coefficient k(f) is determined by means of Expression (9) using the frequency f detected by the frequency detection circuit 510. The correction voltage $V_5$ is determined by multiplying the calculated voltage $V_4$ by the correction coefficient k(f) that is determined. In this way, the correction table is created based on the reference calculation table. The relation between the calculated voltage $V_4$ and the correction voltage $V_5$ is represented by the following Expression (10).

$$V_5 = k(f) \cdot V_4 \quad (10)$$

Although in Embodiment 2 the least-squares method is used to derive the correction coefficient k(f), it is possible to enhance the correction accuracy by adopting a polynomial approximation that uses the Taylor expansion, and the form of Embodiment 2 is not limited to use of the least-squares method.

[Correction Coefficient k(f)]

Figure 6B:
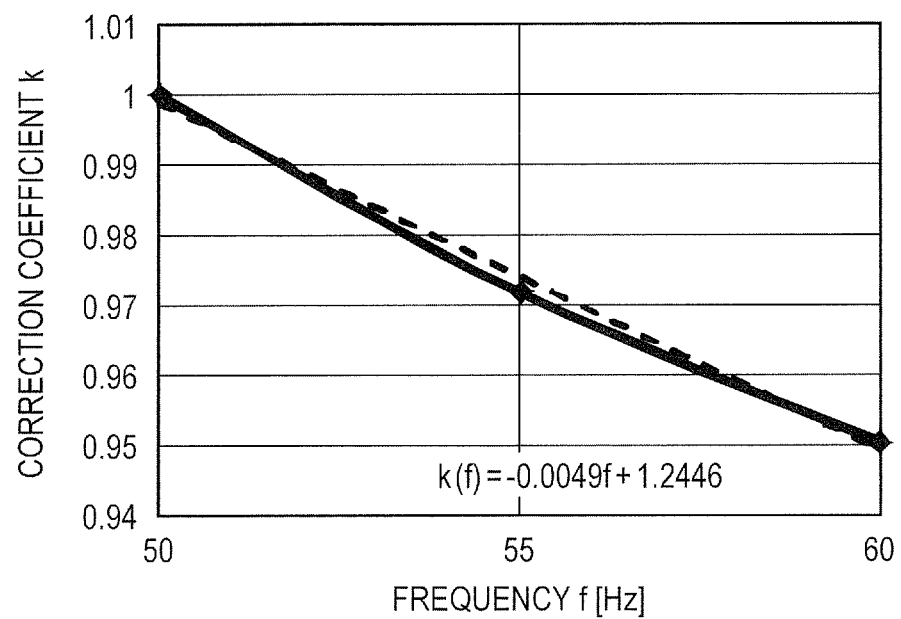
FIG. 6B is a graph illustrating correction coefficients for frequencies.

Next, Embodiment 2 will be described using specific numerical values. It will be assumed that the circuit configuration, various constants and the reference calculation table are the same as those described in Embodiment 1. A curve in FIG. 6B is an approximated curve that is plotted so as to envelope values of the correction coefficient k(f) at each frequency when the frequency f was shifted to 50 Hz, 55 Hz and 60 Hz in a case where the reference frequency $f_0$ was set as equal to 50 Hz. That is, $f_0$ is 50 Hz, $f_1$ is 55 Hz and $f_2$ is 60 Hz, and the relation between these frequencies is $f_0 < f_1 < f_2$. In FIG. 6B, the frequency f[Hz] is shown on the axis of abscissa, and the correction coefficient k(f) is shown on the axis of ordinates. The solid line in FIG. 6B represents an approximated curve that was obtained based on three points that were plotted.

The method for determining the gradient a and inception b of the correction coefficient k(f) in the case illustrated in FIG. 6B will now be described. Taking the alternating-current power supply voltage $V_0$ as equal to 100 V and the reference frequency $f_0$ as equal to 50 Hz, a calculated voltage $V_{4\_50}$ (the aforementioned reference calculated voltage $V_{4\_f_0}$) corresponding to the digital value of the detection voltage $V_2$ that is obtained is calculated from the reference calculation table. Further, taking the alternating-current power supply voltage $V_0$ as equal to 100 V and the frequency $f_2$ as equal to 60 Hz, a calculated voltage $V_{4\_60}$ (the aforementioned calculated voltage $V_{4\_f_2}$) corresponding to the digital value of the detection voltage $V_2$ that is obtained is calculated from the reference calculation table. Based on the two calculated voltages $V_{4\_50}$ and $V_{4\_60}$ that were calculated, a correction coefficient k(60) for the frequency $f_2 = 60$ Hz is determined as $k(60) = V_{4\_50}/V_{4\_60} = 0.95$. Similarly, a correction coefficient k(55) for the frequency $f_1 = 55$ Hz is determined from $k(55) = V_{4\_50}/V_{4\_55}$. Note that the correction coefficient k(50) for the reference frequency $f_0 = 50$ Hz is 1.

Next, a correction coefficient k(f) is determined as a function of the frequency f using the least-squares method based on the correction coefficient k(f) at each frequency. The correction coefficient k(f) in the case illustrated in FIG. 6B is represented by the following Expression (11).

$$k(f) = -0.0049 \times f + 1.2446 \text{ (corresponds to dashed line in FIG. } 6B) \quad (11)$$

In Expression (11), the gradient a of the correction coefficient k(f) is $-0.0049$, and the inception b is 1.2446. The gradient $a = -0.0049$ and the inception $b = 1.2446$ of the correction coefficient k(f) that is derived and the reference calculation table are stored in the non-volatile memory 150.

The way of determining the correction coefficient k(60) will now be described taking a case where the frequency f of the alternating-current power supply 101 detected by the frequency detection circuit 510 is 60 Hz as an example. For example, the correction coefficient k(60) during voltage detection processing when the frequency f of the alternating-current power supply 101 is equal to 60 Hz is determined as shown in Expression (12). The correction voltage $V_5$ is determined from Expression (13) using the correction coefficient k(60) determined by Expression (12) and the calculated voltage $V_4$ of the reference calculation table, and a correction table that is a second table, which is illustrated in FIG. 7C, is obtained.

$$k(60) = -0.0049 \times 60 + 1.2446 = 0.95 \quad (12)$$

$$V_5 = k(60) \cdot V_4 = 0.95 \cdot V_4 \quad (13)$$

A case will now be described in which 100 V in an AD conversion table (60 Hz) illustrated in FIG. 7A is taken as an example. FIG. 7A illustrates a table in a case where the frequency f of the alternating-current power supply 101 is 60 Hz, in which alternating-current power supply voltages $V_0[V]$ are shown in the column on the left side and digital values (digits) after AD conversion of the detection voltage $V_2$ are shown in the column on the right side. FIG. 7B is a reference calculation table as a first table, similarly to FIG. 4B. As illustrated in FIG. 7A, when the alternating-current power supply voltage $V_0$ is 100 V and the frequency f of the alternating-current power supply 101 is 60 Hz, the digital value after AD conversion of the detection voltage $V_2$ is 255. In a case where the digital value after AD conversion of the detection voltage $V_2$ is 255, the calculated voltage $V_4$ obtained from the reference calculation table is 103 V, which means that a value that is higher by 3 V than the actual voltage (100 V) is detected. On the other hand, in the case where the digital value after AD conversion of the detection voltage $V_2$ is 255, the correction voltage $V_5$ obtained from the correction table prepared by means of Expression (13) is 100 V (=0.95×103), and thus the voltage detection error can be made 0 V.

[Voltage Detection Processing]

(Advance Processing)

Figure 8A:
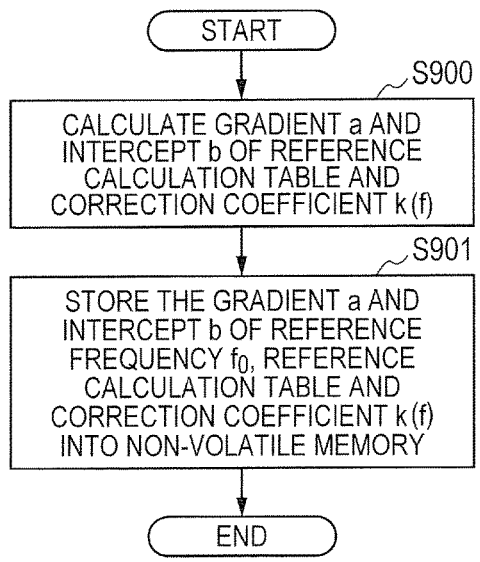
FIG. 8A and FIG. 8B are flowcharts illustrating voltage detection processing according to Embodiment 2.
Figure 8B:
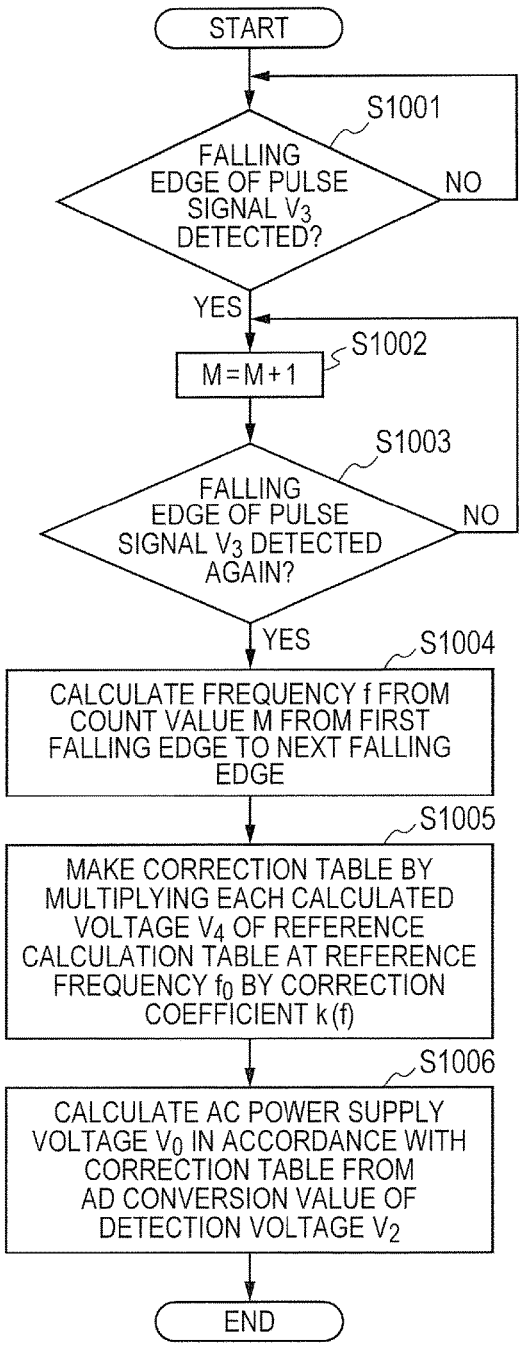

Next, correction control at the time of voltage detection by the CPU 111 of Embodiment 2 is described using the flowcharts in FIG. 8A and FIG. 8B. The operation is divided into advance processing illustrated in FIG. 8A and a time of voltage detection processing illustrated in FIG. 8B. The advance processing is executed in a similar manner to Embodiment 1. In step (hereunder, abbreviated to "S") 900, the CPU 111 determines the relation between digital values (digits) after AD conversion of the detection voltage $V_2$ and the calculated voltage $V_4$ at the reference frequency $f_0$ by experimentation or the like in advance, and creates the reference calculation table. Further, by the method described above, the CPU 111 determines the gradient a and inception b of the correction coefficient k(f) that is a function of the frequency. In S901, the CPU 111 stores the reference frequency $f_0$, and the reference calculation table, and gradient a and inception b of the correction coefficient k(f) determined in S900 in the non-volatile memory 150, and ends the processing.

(Voltage Detection Processing)

At the time of voltage detection, the CPU 111 performs the processing from S1001 onward. In S1001, the CPU 111 determines whether or not the falling edge of the pulse signal $V_3$ that is input from the frequency detection circuit 510 is detected. If the CPU 111 determines in S1001 that the falling edge of the pulse signal $V_3$ is not detected, the CPU 111 returns the processing to S1001, while if the CPU 111 determines that the falling edge is detected, the CPU 111 advances the processing to S1002. In order to ascertain the frequency f from a count value M obtained by the counter 111b during a period until the falling edge of the pulse signal $V_3$ is next detected again, the CPU 111 initializes the count value M and starts the count. The counter 111b is a counter that operates in accordance with an internal clock that the CPU 111 has. In S1002, the CPU 111 adds 1 to the count value M (M=M+1). In S1003, the CPU 111 determines whether or not the falling edge of the pulse signal $V_3$ is detected again. In S1003, if the CPU 111 does not determine that the falling edge of the pulse signal $V_3$ is detected, the CPU 111 returns the processing to S1002, while if the CPU 111 determines that the falling edge is detected, the CPU 111 advances the processing to S1004.

In S1004, the CPU 111 ascertains the frequency f of the alternating-current power supply 101 based on the count value M that was counted during the period from when the falling edge of the pulse signal $V_3$ was detected in S1001 until the falling edge of the pulse signal $V_3$ was detected again in S1003. In S1005, the CPU 111 reads the gradient a and inception b of the correction coefficient k(f) from the non-volatile memory 150, and uses Expression (9) to calculate the correction coefficient k(f) at the frequency f ascertained in S1004. The CPU 111 reads information of the reference calculation table from the non-volatile memory 150, and determines correction voltages $V_5$ by multiplying each calculated voltage $V_4$ of the reference calculation table by the correction coefficient k(f), to thereby create a correction table. In S1006, in accordance with the correction table created in S1005, the CPU 111 calculates the alternating-current power supply voltage $V_0$ (calculated voltage $V_4$) based on the digital value after AD conversion of the detection voltage $V_2$ that was detected by the voltage detection circuit 112, and then ends the processing.

As described above, in Embodiment 2, an alternating-current power supply voltage that is calculated based on a detection result obtained by a voltage detection circuit that uses a transformer is subjected to a correction that is in accordance with the frequency of the alternating-current power supply. Thereby it is possible to reduce a voltage detection error that arises due to the output terminal impedance of the transformer varying depending on the frequency. Note that, the correction of the detection voltage according to Embodiment 2 may also be performed with the circuit configuration of Embodiment 1, and the correction of the detection voltage according to Embodiment 1 may also be performed with the circuit configuration of Embodiment 2. Thus, according to Embodiment 2, when detecting the voltage of an alternating-current power supply using a power transformer, an error in a detection result that depends on the frequency of the alternating-current power supply can be reduced.

In Embodiment 3, in contrast to Embodiments 1 and that relate to a voltage correction method, a power correction method using a current detection transformer is described. Note that, in the following description, parts that are the same as in Embodiments 1 and 2 are denoted by the same reference characters, and a description of such parts is omitted.

[Configuration of Current Detection Circuit]

Figure 9:
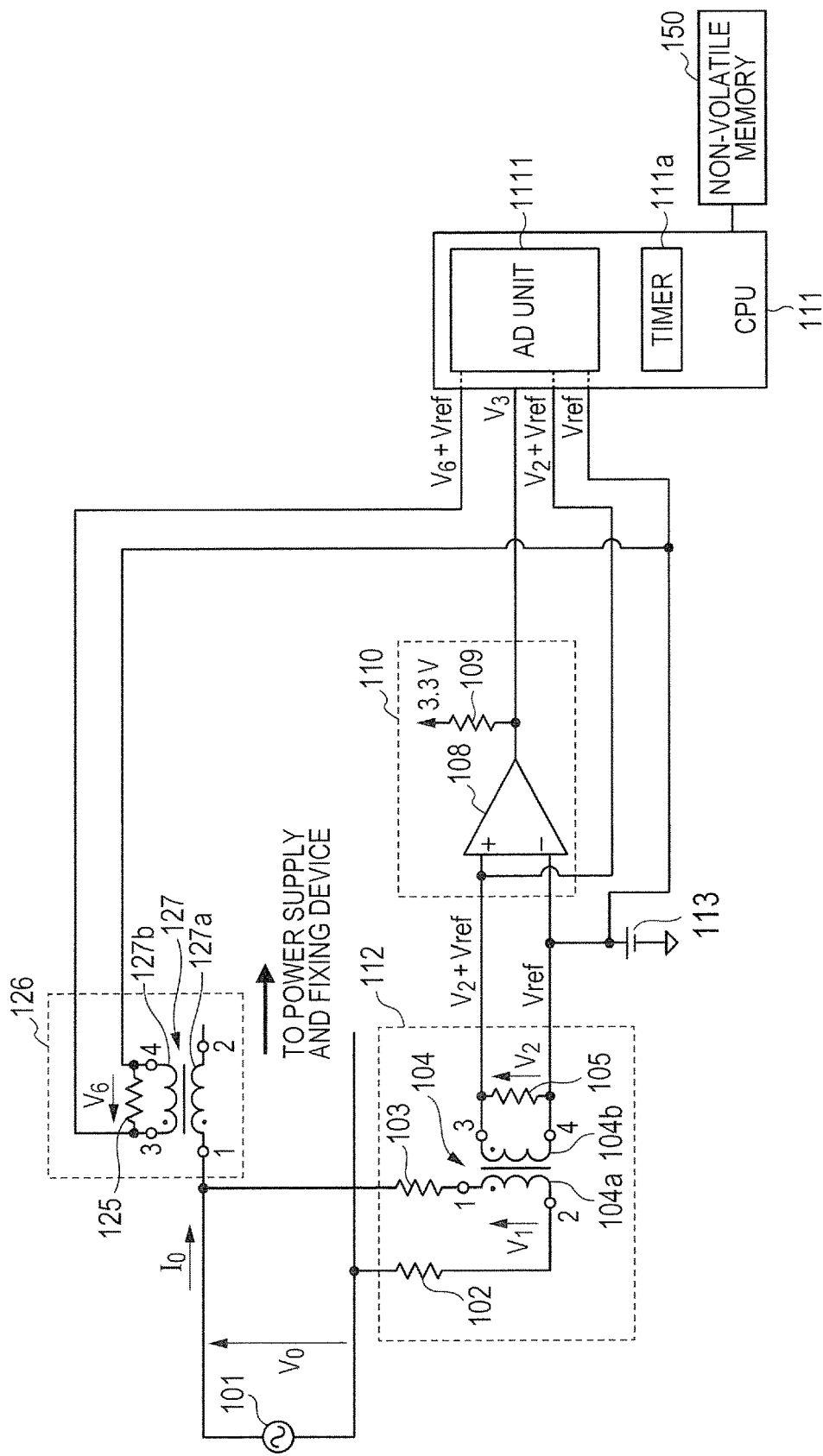
FIG. 9 is a circuit diagram of a power detection circuit according to Embodiment 3.

FIG. 9 is a view illustrating a circuit configuration having a current detection circuit that uses a current detection transformer according to Embodiment 3. The voltage detection circuit 112 and the frequency detection circuit 110 are the same as in FIG. 3 of Embodiment 1. The configuration of a current detection circuit 126 as a current detection unit will now be described. The current detection circuit 126 has a current detection transformer 127 (hereunder, referred to as "transformer 127"). The transformer 127 has a primary winding 127a and a secondary winding 127b. The primary winding 127a and the secondary winding 127b have the same polarity. One end (side connected to the alternating-current power supply 101) of the primary winding 127a is referred to as "terminal 1", and the other end (side connected to a circuit at a subsequent stage (not illustrated in the drawings)) of the primary winding 127a is referred to as "terminal 2". One end (side connected to the direct-current power supply 113) of the secondary winding 127b is referred to as "terminal 4", and the other end of the secondary winding 127b is referred to as "terminal 3". A current detection resistor 125 is connected between terminal 3 and terminal 4 of the secondary winding 127*b* of the transformer 127. The secondary winding 127*b* of the transformer 127 is connected to an input terminal of the CPU 111, and a signal $V_6$ from the secondary winding 127*b* of the transformer 127 is input to the CPU 111.

Note that the transformer 104 corresponds to a first transformer, and the transformer 127 corresponds to a second transformer. The primary winding 104*a* of the transformer 104 corresponds to a first primary winding, and the secondary winding 104*b* of the transformer 104 corresponds to a first secondary winding. The primary winding 127*a* of the transformer 127 corresponds to a second primary winding, and the secondary winding 127*b* of the transformer 127 corresponds to a second secondary winding. The resistance 105 corresponds to a first resistance, and the resistance 125 corresponds to a second resistance. The frequency detection circuit 110 corresponds to a frequency detection unit, and the current detection circuit 126 corresponds to a current detection unit.

[Operations of Current Detection Circuit]

The operations of the current detection circuit 126 in Embodiment 3 will now be described. The current detection circuit 126 is, for example, mounted on lines connected to a power supply apparatus and a fixing apparatus, and is constituted by the transformer 127 and the current detection resistor 125. When a current $I_0$ flows between terminal 1 and terminal 2 of the transformer 127, a voltage $V_6$ that is in accordance with the current value of the current $I_0$ flowing in the primary winding 127*a* and the winding number ratio of the transformer 127 is applied at both ends of the current detection resistor 125. Hereunder, the voltage $V_6$ is referred to as "detection voltage $V_6$". In a state in which the detection voltage $V_6$ has been offset by the offset voltage $V_{ref}$ of the direct-current power supply 113, the detection voltage $V_6$ forms a waveform that resembles the waveform of the current $I_0$ of the alternating-current power supply 101. Hereunder, the current $I_0$ is referred to as "alternating-current power supply current $I_0$". A voltage $(V_6+V_{ref})$ obtained by adding the offset voltage $V_{ref}$ to the detection voltage $V_6$ is input from the terminal 3 of the transformer 127, and the offset voltage $V_{ref}$ is input from the terminal 4 thereof. The voltage that is input from the terminal 3 of the transformer 127 is input to the AD port of the CPU 111, and is converted from an analog value to a digital value by the AD unit 1111. The CPU 111 calculates a power $P_0$ that, for example, is consumed at the power supply apparatus or the fixing apparatus based on the detection voltage $V_6$, the detection voltage $V_2$ described in Embodiment (similar waveform as alternating-current power supply voltage $V_0$), and the offset voltage $V_{ref}$. Hereunder, the power that is calculated by the CPU 111 is referred to as "calculated power $P_1$".

[Calculation of Calculated Power $P_1$]

Next, the method by which the CPU 111 calculates the calculated power $P_1$ will be described. The CPU 111 determines the calculated power $P_1$ based on the product of the respective digital values after AD conversion of the detection voltage $V_2$ and the detection voltage $V_6$ by using a calculation table. The calculation table for determining the calculated power $P_1$ based on the product of the respective digital values after AD conversion of the detection voltage $V_2$ and the detection voltage $V_6$ is stored in the non-volatile memory 150.

FIG. 11A illustrates a table in a case where the frequency f of the alternating-current power supply 101 is 60 Hz, in which the power $P_0$[W] is shown in the column on the left side, and a product (digit) of the respective digital values after AD conversion of the detection voltage $V_2$ and the detection voltage $V_6$ is shown in the column on the right side. FIG. 11B illustrates a reference calculation table as a third table for a case where the reference frequency $f_0$ is taken as $f_0$=50 Hz, in which a product (digit) of the respective digital values after AD conversion of the detection voltage $V_2$ and the detection voltage $V_6$ is shown in the column on the left side, and the calculated power $P_1$ [W] is shown in the column on the right side. FIG. 11C illustrates a calculation table (hereunder, referred to as "correction table") as a fourth table that is a table obtained after the reference calculation table is corrected, in a case where the frequency of the alternating-current power supply 101 is 60 Hz. In FIG. 11C, a product (digit) of the respective digital values after AD conversion of the detection voltage $V_2$ and the detection voltage $V_6$ is shown in the column on the left side, and a corrected power $P_2$[W] is shown in the column on the right side. For example, in a case where the reference calculation table (50 Hz) of FIG. 11B is stored in the non-volatile memory 150 and the product of the respective digital values is 360, the CPU 111 refers to the digital value 360 in the reference calculation table and determines that the calculated power $P_1$=1303 W.

However, as described in Embodiment 1, because the relation between the alternating-current power supply voltage $V_0$ and the detection voltage $V_2$ varies depending on the alternating-current power supply frequency f, the calculated power $P_1$ that is determined using the detection voltage $V_2$ also varies depending on the alternating-current power supply frequency f, and an error arises in the power detection.

[Correction of Calculated Power $P_1$]

Next, a method for correcting a power detection error is described. It is possible for the CPU 111 to accurately correct an error that occurs during power detection, by multiplying a correction coefficient that is expressed as a function of the frequency f in the reference calculation table. When correcting the calculated power $P_1$ in accordance with the frequency f of the alternating-current power supply 101, the reference frequency $f_0$ is determined in advance, and a reference calculation table at the reference frequency $f_0$ is created. Specifically, the calculated powers $P_1$ for the reference calculation table are determined in a case where the power $P_0$ is fixed and the frequency f is caused to vary. For example, a calculation result at the reference frequency $f_0$ for a certain alternating-current power supply voltage $V_0$ is taken as a reference calculated power $P_{1\_}f_0$. The frequency f is changed to $f_0$, $f_1$ and $f_2$ in a state in which the power $P_0$ is fixed. Here, the relation between the frequencies $f_0$, $f_1$ and $f_2$ is $f_0<f_1<f_2$. Next, in accordance with the reference calculation table, calculated powers $P_1$ obtained at the time of the frequencies $f_1$ and $f_2$, respectively, are calculated as $P_{1\_}f_1$ and $P_{1\_}f_2$, respectively. Thereafter, based on the amount of variation between the calculated powers $P_{1\_}f_1$ and $P_{1\_}f_2$ at the respective frequencies and the reference calculated power $P_{1\_}f_0$, a correction coefficient g(f) represented by Expression (14) is derived by the least-squares method. The correction coefficient g(f) is expressed as a primary function of a gradient c, an inception d and the frequency f.

$$g(f)=c \cdot f+d \qquad (14)$$

The gradient c and the inception d of the correction coefficient g(f), and the reference calculation table are recorded in advance in the non-volatile memory 150. At the time of power detection, the correction coefficient g(f) is determined by means of Expression (14) using the frequency f detected by the frequency detection circuit 510. In this way, the correction table is created based on the reference calculation table. The relation between the calculated power $P_1$ and the corrected power $P_2$ is represented by the following Expression (15).

$$P_2 = g(f) \cdot P_1 \quad (15)$$

Although in Embodiment 3 the least-squares method is used to derive the correction coefficient $g(f)$, it is possible to enhance the correction accuracy by adopting a polynomial approximation that uses the Taylor expansion, and the form of Embodiment 3 is not limited to use of the least-squares method.

[Correction Coefficient $g(f)$]

Figure 10:
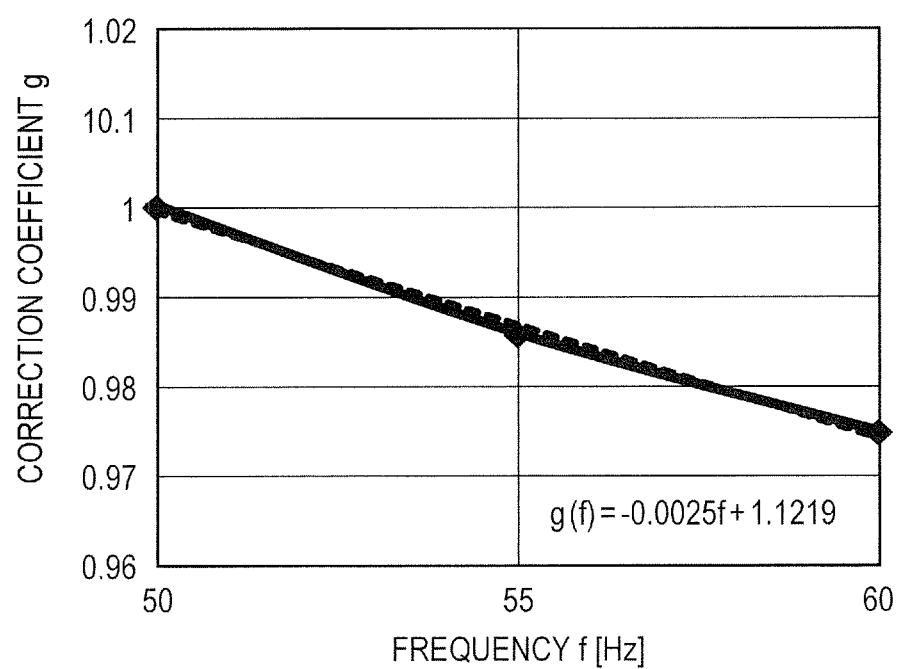
FIG. 10 is a graph illustrating correction coefficients for frequencies according to Embodiment 3.

Next, Embodiment 3 will be described using specific numerical values. A curve shown in FIG. 10 is an approximated curve that is plotted so as to envelope values of the correction coefficient $g(f)$ at each frequency when the frequency f was shifted to 50 Hz, 55 Hz and 60 Hz in a case where the reference frequency $f_0$ was set as equal to 50 Hz. That is, $f_0$ is 50 Hz, $f_1$ is 55 Hz and $f_2$ is 60 Hz, and the relation between these frequencies is $f_0 < f_1 < f_2$. In FIG. 10, the frequency f[Hz] is shown on the axis of abscissa, and the correction coefficient $g(f)$ is shown on the axis of ordinates. The solid line in FIG. 10 represents an approximated curve that was obtained based on three points that were plotted.

The method for determining the gradient c and inception d of the correction coefficient $g(f)$ in the case illustrated in FIG. 10 will now be described. A calculated power $P_{1\_50}$ (the aforementioned reference calculated power $P_{1\_f_0}$) obtained when the power $P_0=1008$ W and the reference frequency $f_0=50$ Hz is calculated from the reference calculation table. Further, a calculated power $P_{160}$ (the aforementioned reference calculated power $P_{1\_f_2}$) obtained when the frequency f=60 Hz is calculated from the reference calculation table. Based on the two calculated powers $P_{1\_50}$ and $P_{1\_60}$ that were calculated, a correction coefficient $g(60)$ for the frequency $f_2=60$ Hz is determined as $g(60)=P_{1\_50}/P_{1\_60}=0.95$. Similarly, a correction coefficient $g(55)$ for the frequency $f_1=55$ Hz is determined based on $g(55)=P_{1\_50}/P_{1\_55}$. Note that, the correction coefficient $g(50)$ for the reference frequency $f_0=50$ Hz is 1.

Next, a correction coefficient $g(f)$ is determined as a function of the frequency f using the least-squares method based on the correction coefficient $g(f)$ for each frequency. The correction coefficient $g(f)$ in the case illustrated in FIG. 10 is represented by the following Expression (16).

$$g(f) = -0.0025 \times f + 1.1219 \text{ (corresponds to dashed line in FIG. 10)} \quad (16)$$

In Expression (16), the gradient c of the correction coefficient $g(f)$ is $-0.0025$ and the inception d is 1.1219. The gradient $c=-0.0025$ and the inception $d=1.1219$ of the correction coefficient $g(f)$ that is derived and the reference calculation table are recorded in the non-volatile memory 150.

The way of determining the correction coefficient $g(60)$, the calculated power $P_1$ and the corrected power $P_2$ will now be described taking a case where the frequency f of the alternating-current power supply 101 detected by the frequency detection circuit 510 is 60 Hz as an example. For example, the correction coefficient $g(60)$ during power detection processing when the frequency f of the alternating-current power supply 101 is equal to 60 Hz is determined as shown in Expression (17). The corrected power $P_2$ is determined from Expression (18) using the correction coefficient $g(60)$ determined by Expression (17) and the calculated power $P_1$ of the reference calculation table, and a correction table that is a fourth table, which is illustrated in FIG. 11C, is obtained.

$$g(60) = -0.0025 \times 60 + 1.1219 = 0.972 \quad (17)$$

$$P_2 = g(60) \cdot P_1 = 0.972 \cdot P_1 \quad (18)$$

A case will now be described in which power $P_0=1303$ W in the AD conversion table (60 Hz) illustrated in FIG. 11A is taken as an example. As illustrated in FIG. 11A, when the power $P_0$ is 1303 W and the frequency f of the alternating-current power supply 101 is 60 Hz, the digital value after AD conversion of the product of the detection voltage $V_2$ and the detection voltage $V_6$ is 369. In the case where the digital value after AD conversion of the product of the two detection voltages is 369, the calculated power $P_1$ determined from the reference calculation table will be approximately 1340 W, and will thus be detected as being close to 40 W that the actual power (1303 W). In contrast, in the case where the digital value after AD conversion of the product of the two detection voltages is 369, the corrected power $P_2$ determined from the correction table created using Expression (18) will be $P_2=0.972 \times 1340=1303$ W, and thus the occurrence of an error in the power detection can be suppressed.

[Power Detection Processing]

(Advance Processing)

Figure 12A:
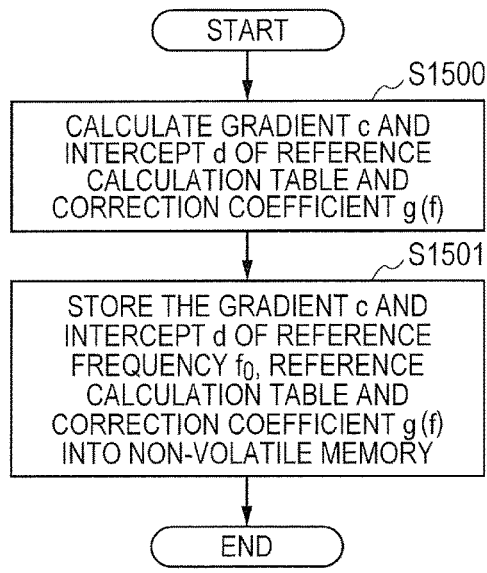
FIG. 12A and FIG. 12B are flowcharts illustrating power detection processing according to Embodiment 3.
Figure 12B:
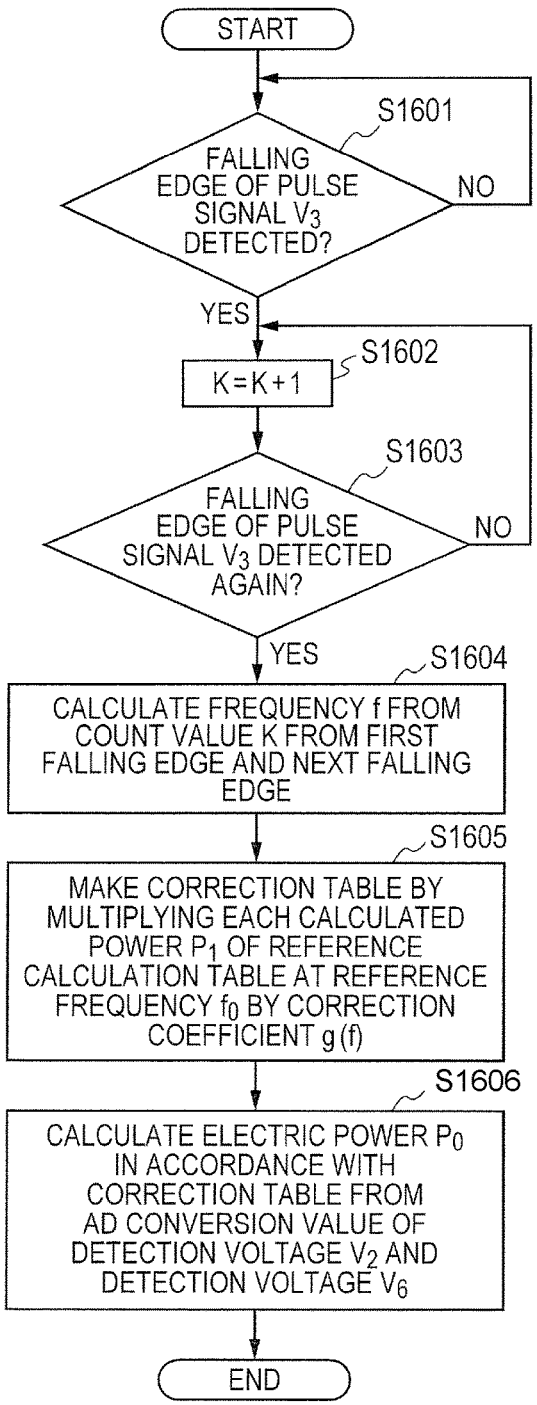

Next, correction control at the time of power detection by the CPU 111 of Embodiment 3 is described using the flowcharts in FIG. 12A and FIG. 12B. The operation is divided into advance processing illustrated in FIG. 12A and a time of power detection processing illustrated in FIG. 12B. The advance processing is executed in a similar manner to Embodiment 2. In S1500, the CPU 111 determines the relation between digital values after AD conversion of the product of the detection voltage $V_2$ and detection voltage $V_6$ and the calculated power $P_1$ at the reference frequency $f_0$ by experimentation or the like in advance, and creates the reference calculation table. Further, by the method described above, the CPU 111 determines the gradient c and inception d of the correction coefficient $g(f)$ that is a function of the frequency. In S1501, the CPU 111 stores the reference frequency $f_0$, and the reference calculation table and the gradient c and inception d of the correction coefficient $g(f)$ that were determined in S1500 in the non-volatile memory 150, and ends the processing.

(Power Detection Processing)

When performing power detection, the CPU 111 performs the processing from S1601 onward. In S1601, the CPU 111 determines whether or not the falling edge of the pulse signal $V_3$ that is input from the frequency detection circuit 510 is detected. If the CPU 111 determines in S1601 that the falling edge of the pulse signal $V_3$ is not detected, the CPU 111 returns the processing to S1601, while if the CPU 111 determines that the falling edge is detected, the CPU 111 advances the processing to S1602. In order to ascertain the frequency f from a count value K obtained by the counter 111*b* during a period until the falling edge of the pulse signal $V_3$ is next detected again, the CPU 111 initializes the count value K and starts the count. The counter 111*b* is a counter that operates in accordance with an internal clock that the CPU 111 has. In S1602, the CPU 111 adds 1 to the count value K (K=K+1). In S1603, the CPU 111 determines whether or not the falling edge of the pulse signal $V_3$ is detected again. In S1603, if the CPU 111 does not determine that the falling edge of the pulse signal $V_3$ is detected, the CPU 111 returns the processing to S1602, while if the CPU 111 determines that the falling edge is detected, the CPU 111 advances the processing to S1604.

In S1604, the CPU 111 ascertains the frequency f of the alternating-current power supply 101 based on the count value K that was counted during the period from when the falling edge of the pulse signal $V_3$ was detected in S1601 until the falling edge of the pulse signal $V_3$ was detected again in S1603. In S1605, the CPU 111 reads the gradient c and inception d of the correction coefficient g(f) from the non-volatile memory 150, and uses Expression (14) to calculate the correction coefficient g(f) at the frequency f that was ascertained in S1604. The CPU 111 reads information of the reference calculation table from the non-volatile memory 150, and determines corrected powers $P_2$ by multiplying each calculated power $P_1$ of the reference calculation table by the correction coefficient g(f), to thereby create a correction table. In S1606, in accordance with the correction table created in S1605, the CPU 111 calculates the power $P_0$ (corrected power $P_2$) based on the digital value after AD conversion of the product of the detection voltage $V_2$ and detection voltage $V_6$ detected by the voltage detection circuit 112, and then ends the processing.

As described above, in Embodiment 3, a power calculated based on detection results obtained by a voltage detection circuit that uses a transformer and a current detection circuit is subjected to a correction that is in accordance with the frequency of the alternating-current power supply. Thereby it is possible to reduce a power detection error that arises due to the output terminal impedance of the transformer varying depending on the frequency. Note that, although in Embodiment 3 circuitry that is obtained by adding a current detection circuit to the circuit configuration of Embodiment 1 is described, the correction of a calculated power according to Embodiment 3 may also be performed with respect to circuitry obtained by adding a current detection circuit to the circuit configuration of Embodiment 2. Thus, according to Embodiment 3, an error in a detection result that depends on the frequency of an alternating-current power supply that uses a power transformer can be reduced when performing a calculation to determine the power using a voltage detection result of the alternating-current power supply.

The methods for correcting an alternating-current power supply voltage calculated based on a detection result of a voltage detection circuit according to Embodiments 1 and 2 and for correcting a power detection result according to Embodiment 3 in accordance with the frequency of the alternating-current power supply are also applicable to an image forming apparatus. For example, in an image forming apparatus, a detection result of a voltage detection apparatus is used when detecting for an abnormality in an input voltage that was input from an alternating-current power supply. Further, for example, a detection result of the voltage detection apparatus is used when detecting an input voltage of a commercial power supply in a region in which the image forming apparatus is installed. Furthermore, for example, a detection result of the voltage detection apparatus is used for controlling the supply of power to a fixing device of the image forming apparatus. The configuration of an image forming apparatus is described hereunder.

[Configuration of Image Forming Apparatus]

Figure 13:
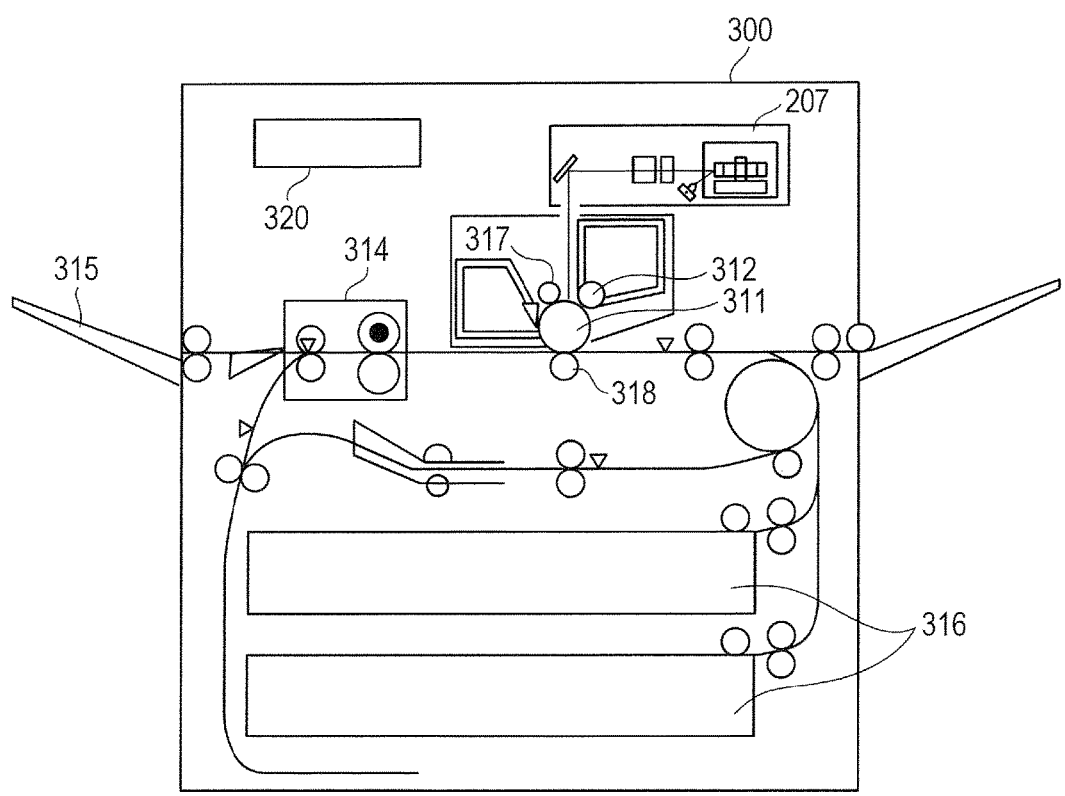
FIG. 13 is a view illustrating the configuration of an image forming apparatus according to Embodiment 4.

A laser beam printer will be described as one example of an image forming apparatus. FIG. 13 illustrates the schematic configuration of a laser beam printer that is one example of a printer that adopts an electrophotographic system. A laser beam printer 300 includes a photosensitive drum 311 as an image bearing member on which an electrostatic latent image is formed by an exposure apparatus 207 as an exposure unit, and a charging unit 317 (charge unit) that uniformly charges the photosensitive drum 311. The laser beam printer 300 also includes a developing unit 312 (development unit) that develops an electrostatic latent image formed on the photosensitive drum 311 with toner. A toner image that was developed on the photosensitive drum 311 (on the image bearing member) is transferred by a transfer unit 318 (transferring unit) onto a sheet (not illustrated in the drawing) as a transfer member that is supplied from a cassette 316. The unfixed toner image that was transferred onto the sheet (onto the transfer member) is fixed thereon by a fixing device 314, and the sheet is then discharged to a tray 315. The laser beam printer 300 includes a controller 320 that is a control unit that controls image forming operations by an image forming unit and sheet conveyance operations. The fixing device 314 has a heater, and power that is supplied to the heater from the alternating-current power supply is controlled by the controller 320. When performing operations to control the power that is supplied to the fixing device 314, the controller 320 detects an alternating-current power supply voltage $V_0$ (correction voltage $V_5$) of the alternating-current power supply by means of the voltage detection apparatus of Embodiment 1 or Embodiment 2. Note that, a CPU which the controller 320 has may function as the CPU 111 of Embodiment 1 or 2.

The photosensitive drum 311, charging unit 317, developing unit 312, and transfer unit 318 constitute the image forming unit. Note that the image forming apparatus is not limited to the apparatus illustrated in FIG. 13 and, for example, may be an image forming apparatus equipped with a plurality of image forming units. In addition, the image forming apparatus may be an image forming apparatus that includes a primary transfer unit that transfers a toner image formed on the photosensitive drum 311 onto an intermediate transfer belt, and a secondary transfer unit that transfers the toner image on the intermediate transfer belt onto a sheet.

Thus, according to Embodiment 3, when detecting the voltage of an alternating-current power supply that uses a power transformer, an error in a detection result that depends on a frequency of the alternating-current power supply can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-230405, filed Nov. 28, 2016, which is hereby incorporated by reference herein in its entirety.

What is claimed is:

1. A voltage detection apparatus comprising:
    a first line and a second line configured to supply an alternating voltage that is input from an alternating current power supply to a load;
    a transformer, in which a primary side and a secondary side are insulated from each other, the primary side connected in parallel with the first line and the second line, configured to output an output voltage from the secondary side of the transformer according to the alternating voltage supplied to the primary side;
    a detection circuit configured to detect a frequency of the alternating voltage; and
    a correction unit configured to acquire information corresponding to the output voltage and information corresponding to the frequency that is detected by the detection circuit, and that corrects the information corresponding to the output voltage according to the information corresponding to the frequency.

2. A voltage detection apparatus according to claim 1, wherein the detection circuit is a circuit that is connected to the secondary side of the transformer, and that detects a zero-crossing signal of the alternating voltage; and the correction unit calculates the frequency based on the zero-crossing signal.

3. A voltage detection apparatus according to claim 1, wherein the detection circuit is a circuit that is connected in parallel with the first line and the second line, and that detects a zero-crossing signal of the alternating voltage; and the correction unit calculates the frequency based on the zero-crossing signal.

4. A voltage detection apparatus according to claim 1, wherein the correction unit controls an electric power that is supplied to the load based on a correction result obtained by correcting the information corresponding to the output voltage.

5. A voltage detection apparatus according to claim 1, further comprising:

a memory unit configured to store correction information for correcting the alternating voltage, wherein the correction unit reads out correction information corresponding to the information corresponding to the frequency that is detected by the detection circuit from the memory unit, and corrects the alternating voltage using the correction information that is read out.

6. A voltage detection apparatus according to claim 1, further comprising:

a conversion unit configured to convert an analog value that is input to a digital value;

a calculation unit configured to calculate a voltage that is output from the transformer; and a memory unit in which a predetermined frequency of the alternating-current power supply, a first table for calculating a voltage by means of the calculation unit based on a digital value obtained by conversion by the conversion unit with respect to the predetermined frequency, and a coefficient for correcting a voltage calculated by the calculation unit by means of the correction unit according to a frequency that is detected by the detection circuit are stored.

7. A voltage detection apparatus according to claim 6, wherein the coefficient is set based on voltages calculated by the calculation unit when an alternating voltage of the alternating-current power supply is made constant and a frequency of the alternating-current power supply is caused to vary.

8. A voltage detection apparatus according to claim 6, wherein based on a frequency detected by the detection circuit, and the predetermined frequency, the first table and the coefficient that are stored in the memory unit, the correction unit generates a second table for determining the corrected voltage based on a digital value obtained by conversion by the conversion unit with respect to a frequency that is detected by the detection circuit.

9. A voltage detection apparatus according to claim 6, wherein the coefficient is represented as a function of a frequency of the alternating-current power supply.

10. A voltage detection apparatus according to claim 9, wherein the coefficient is represented as a primary function, and a gradient and an inception of the primary function are stored in the memory unit.

11. A voltage detection apparatus according to claim 10, wherein based on a frequency detected by the detection circuit, and the predetermined frequency, the first table, the gradient and the inception that are stored in the memory unit, the correction unit generates a second table for determining the corrected voltage based on a digital value obtained by conversion by the conversion unit with respect to a frequency that is detected by the detection circuit.

12. A voltage detection apparatus according to claim 6, further comprising:

a direct-current power supply connected to one end on the secondary side of the transformer, wherein the calculation unit calculates the calculated voltage based on a direct-current voltage that is input from the direct-current power supply and a voltage input from another end on the secondary side of the transformer.

13. A voltage detection apparatus according to claim 1, wherein the detection circuit outputs a pulse signal having a frequency according to a frequency of the alternating-current power supply to the correction unit.

14. A voltage detection apparatus according to claim 1, further comprising a resistor connected to the secondary side of the transformer, wherein an amplitude of a voltage generated on the resistor increases as a frequency of the alternating-current power supply rises.

15. A voltage detection apparatus according to claim 1, further comprising:

a current detection unit connected to one end of the alternating-current power supply, and that detects a current flowing from the alternating-current power supply; and a calculation unit configured to calculate an electric power supplied from the alternating voltage based on a voltage that is output from the transformer and a voltage that is detected by the current detection unit, wherein the correction unit determines an electric power that is obtained by correcting a voltage calculated by the calculation unit based on a frequency detected by a frequency detection unit.

16. An image forming apparatus comprising:

an image forming unit connected to a first signal wire and a second signal wire to which an alternating voltage from a commercial alternating current power supply is supplied, and to which an electric power is supplied;

a transformer in which a primary side and a secondary side are insulated from each other, and the primary side is connected in parallel with the first signal wire and the second signal wire, and configured to output an output voltage from the secondary side of the transformer according to the alternating voltage supplied to the primary side;

a detection circuit configured to detect a frequency of the alternating voltage;

a correction unit configured to acquire information corresponding to the output voltage and information corresponding to the frequency that is detected by the detection circuit, and that corrects the information corresponding to the output voltage according to the information corresponding to the frequency; and a control unit configured to control an electric power that is supplied to the image forming unit based on the information corresponding to the voltage that is corrected.

17. An image forming apparatus according to claim 16, wherein the image forming unit includes any of:

a latent image forming unit configured to form an electrostatic latent image on an image bearing member;

a developing unit configured to develop an electrostatic latent image on the image bearing member by means of toner to form a toner image, a transfer unit configured to transfer a toner image formed on the developing unit onto a transfer member, and a fixing unit configure to fixe an unfixed toner image that is transferred onto the transfer member.

18. An image forming apparatus according to claim 17, further comprising a control unit configured to control an electric power that is supplied to the fixing unit based on a detection result of the detection circuit.

19. An image forming apparatus according to claim 17, further comprising a control unit that controls an image forming operation based on a voltage that is corrected by the correction unit.

* * * * *